(12) United States Patent
Aase et al.

(10) Patent No.: US 8,796,555 B2
(45) Date of Patent: Aug. 5, 2014

(54) MOLDED SPLITTER STRUCTURES AND METHODS FOR MAKING THE SAME

(75) Inventors: Jonathan Aase, Redwood City, CA (US); Cameron Frazier, San Carlos, CA (US); Peter Russell-Clarke, San Francisco, CA (US); Paul Choiniere, Livermore, CA (US); Greg Dunham, Cupertino, CA (US); Kurt Stiehl, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 616 days.

(21) Appl. No.: 13/013,537

(22) Filed: Jan. 25, 2011

(65) Prior Publication Data

US 2011/0182459 A1    Jul. 28, 2011

Related U.S. Application Data

(60) Provisional application No. 61/298,087, filed on Jan. 25, 2010, provisional application No. 61/384,103, filed on Sep. 17, 2010, provisional application No. 61/319,772, filed on Mar. 31, 2010, provisional application No. 61/384,097, filed on Sep. 17, 2010, provisional application No. 61/326,102, filed on Apr. 20, 2010, provisional application No. 61/349,768, filed on May 28, 2010, provisional application No. 61/378,311, filed on Aug. 30, 2010, provisional application No. 61/378,314, filed on Aug. 30, 2010.

(51) Int. Cl.
*H05K 1/09*    (2006.01)

(52) U.S. Cl.
USPC ....... 174/251; 174/72 A; 174/72 R; 174/74 A

(58) Field of Classification Search
USPC ...... 174/251, 72 R, 72 C, 71 C, 85, 88 R, 91, 174/114 R, 121 R, 121 A, 74 A, 75 F, 77 R, 174/94 R, 82, 152 G, 153 G; 439/556, 559; 248/56; 16/2.1, 2.2
See application file for complete search history.

(56) References Cited

U.S. PATENT DOCUMENTS

| | | | |
|---|---|---|---|
| 2,937,228 A | | 5/1960 | Robinson |
| 3,151,211 A | * | 9/1964 | Reid et al. .................... 174/72 R |
| 3,178,770 A | | 4/1965 | Willis |
| D214,906 S | * | 8/1969 | Steinmeyer .................. D13/173 |
| 3,845,414 A | * | 10/1974 | McKenzie ..................... 333/185 |
| 3,928,519 A | | 12/1975 | Kashiyama et al. |
| 4,094,688 A | * | 6/1978 | Wolf ............................. 106/38.2 |
| 4,110,394 A | | 8/1978 | Shimada et al. |
| 4,217,465 A | * | 8/1980 | Holden ....................... 174/138 F |
| 4,385,203 A | | 5/1983 | Faranetta et al. |
| 4,467,002 A | * | 8/1984 | Crofts .......................... 428/34.9 |
| 4,646,872 A | | 3/1987 | Kamon et al. |
| 4,822,956 A | * | 4/1989 | Sepe ............................. 174/103 |
| 4,849,582 A | * | 7/1989 | Stevenson ..................... 174/135 |

(Continued)

OTHER PUBLICATIONS

Notice of Allowance for U.S. Appl. No. 13/077,027, mailed Jan. 16, 2013, 13 pages.

*Primary Examiner* — Lisa Lea Edmonds
*Assistant Examiner* — Chrisopher L Augustin
(74) *Attorney, Agent, or Firm* — Van Court & Aldridge LLP

(57) ABSTRACT

Molded splitter structures and systems and methods for manufacturing molded splitter structures are disclosed.

21 Claims, 20 Drawing Sheets

(56) References Cited

U.S. PATENT DOCUMENTS

| | | | |
|---|---|---|---|
| 4,879,807 A | 11/1989 | Roucaute | |
| 4,924,037 A | 5/1990 | Ainsworth et al. | |
| 5,021,611 A | 6/1991 | Amano | |
| 5,113,039 A | 5/1992 | Guipe et al. | |
| 5,283,392 A | 2/1994 | Ooshima et al. | |
| 5,397,860 A | 3/1995 | Yochum et al. | |
| 5,563,376 A | 10/1996 | Hansell et al. | |
| 5,917,151 A * | 6/1999 | O'Brien et al. | 174/72 A |
| 5,917,155 A | 6/1999 | Hake et al. | |
| 6,050,847 A | 4/2000 | Kawakami et al. | |
| 6,291,770 B1 | 9/2001 | Casperson | |
| 6,392,155 B1 | 5/2002 | Shimizu et al. | |
| 6,439,933 B1 | 8/2002 | Moji | |
| 6,576,841 B1 * | 6/2003 | Brannan et al. | 174/74 A |
| 6,644,117 B1 | 11/2003 | Kueck et al. | |
| D526,642 S | 8/2006 | Choe | |
| 7,288,000 B2 | 10/2007 | Liu et al. | |
| 7,314,999 B2 | 1/2008 | Dobler | |
| D605,628 S | 12/2009 | Ando | |
| 7,853,302 B2 | 12/2010 | Rodriguez et al. | |
| 7,899,548 B2 | 3/2011 | Barker | |
| 8,126,557 B2 | 2/2012 | Jang et al. | |
| 8,162,697 B1 | 4/2012 | Menolotto et al. | |
| 8,182,293 B2 | 5/2012 | Tang et al. | |
| 8,206,181 B2 | 6/2012 | Steijner | |
| 8,235,756 B2 | 8/2012 | Stiehl | |
| 8,249,286 B2 | 8/2012 | Nault | |
| 8,267,727 B2 | 9/2012 | Lynch et al. | |
| 8,287,315 B2 | 10/2012 | Montena | |
| 8,308,505 B2 | 11/2012 | Hatton et al. | |
| 8,363,873 B2 | 1/2013 | Liu et al. | |
| 8,562,890 B2 | 10/2013 | Aase et al. | |
| 2002/0017392 A1 | 2/2002 | Efraimsson et al. | |
| 2006/0169473 A1 | 8/2006 | Dobler | |
| 2007/0020989 A1 | 1/2007 | Liu et al. | |
| 2010/0104126 A1 | 4/2010 | Greene | |
| 2011/0044487 A1 | 2/2011 | Nault | |
| 2011/0051973 A1 | 3/2011 | Liu et al. | |
| 2011/0136375 A1 | 6/2011 | Hatton et al. | |
| 2011/0180302 A1 | 7/2011 | Aase et al. | |
| 2011/0180303 A1 | 7/2011 | Aase et al. | |
| 2011/0180321 A1 | 7/2011 | Aase et al. | |
| 2011/0182459 A1 | 7/2011 | Aase et al. | |
| 2011/0182460 A1 | 7/2011 | Aase et al. | |
| 2011/0243346 A1 | 10/2011 | Aase et al. | |
| 2011/0243360 A1 | 10/2011 | Aase | |
| 2011/0256779 A1 | 10/2011 | Aase | |

* cited by examiner

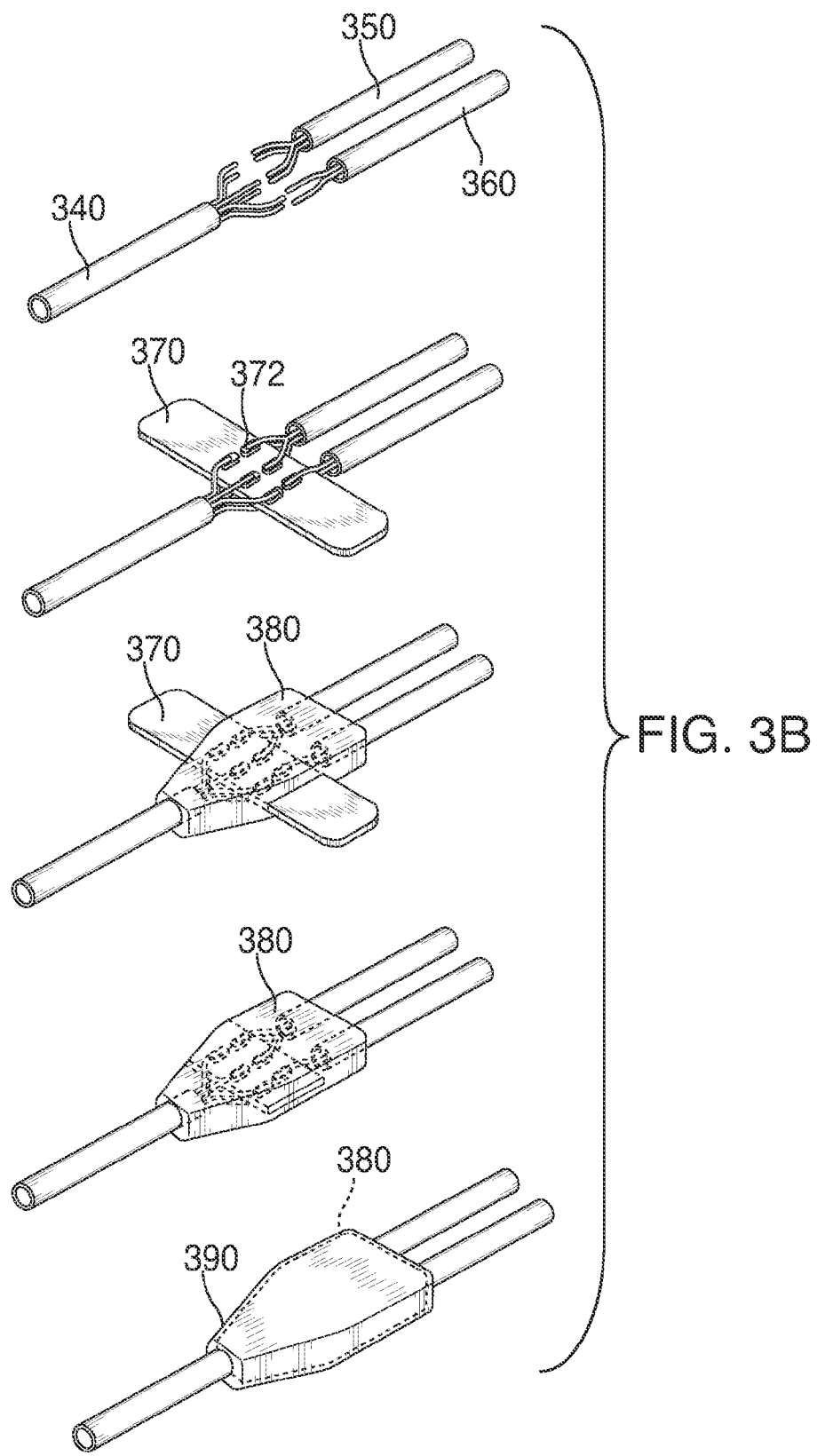

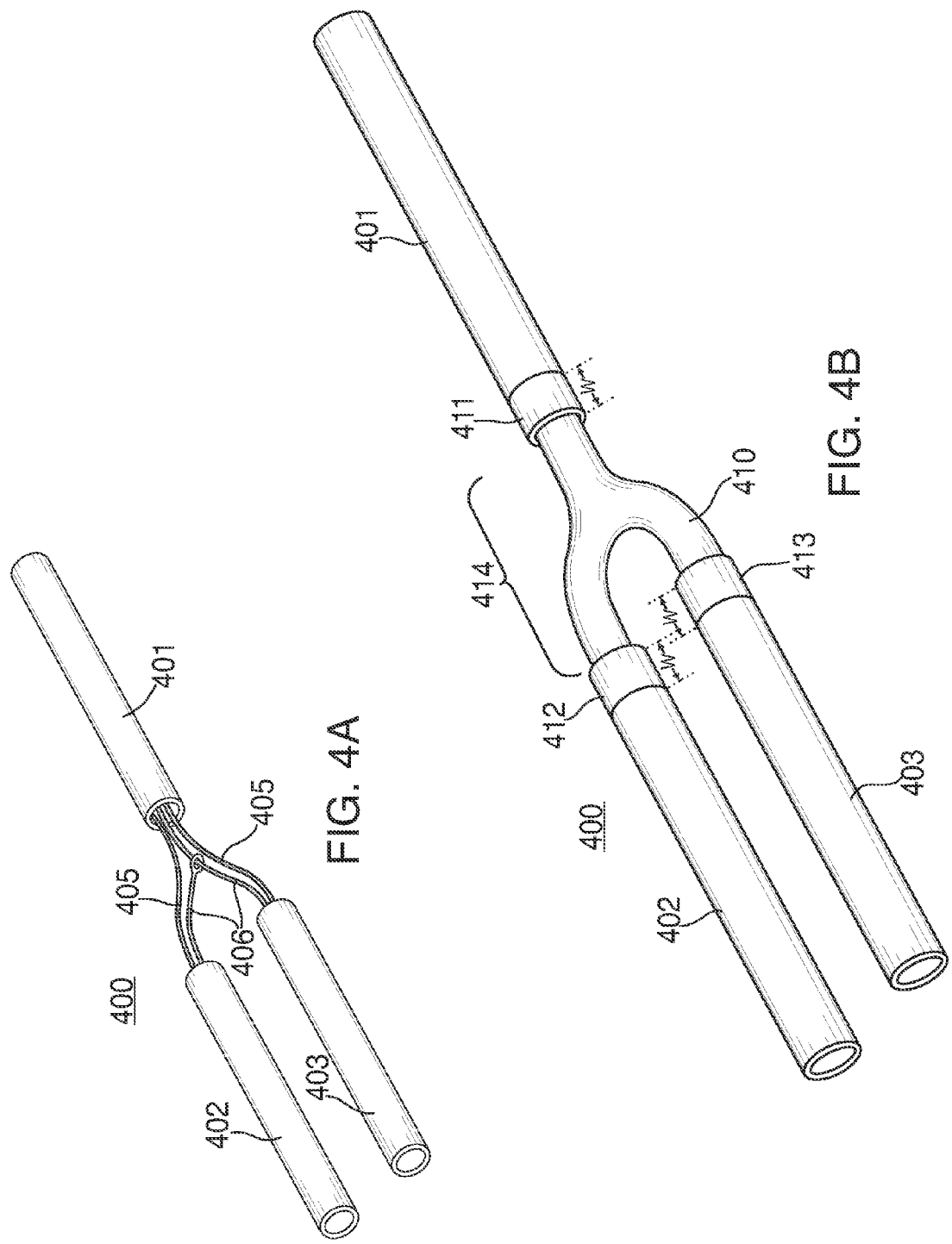

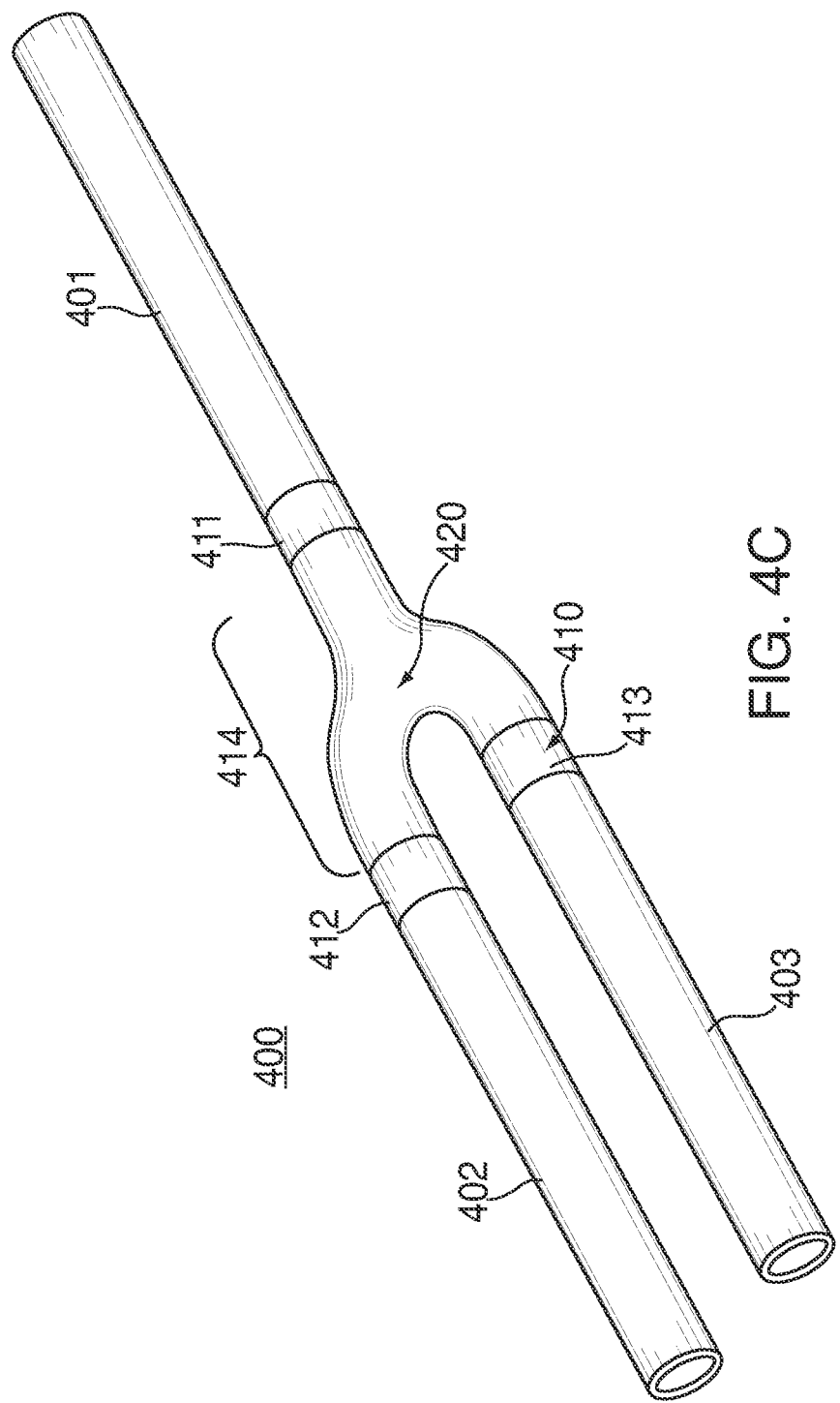

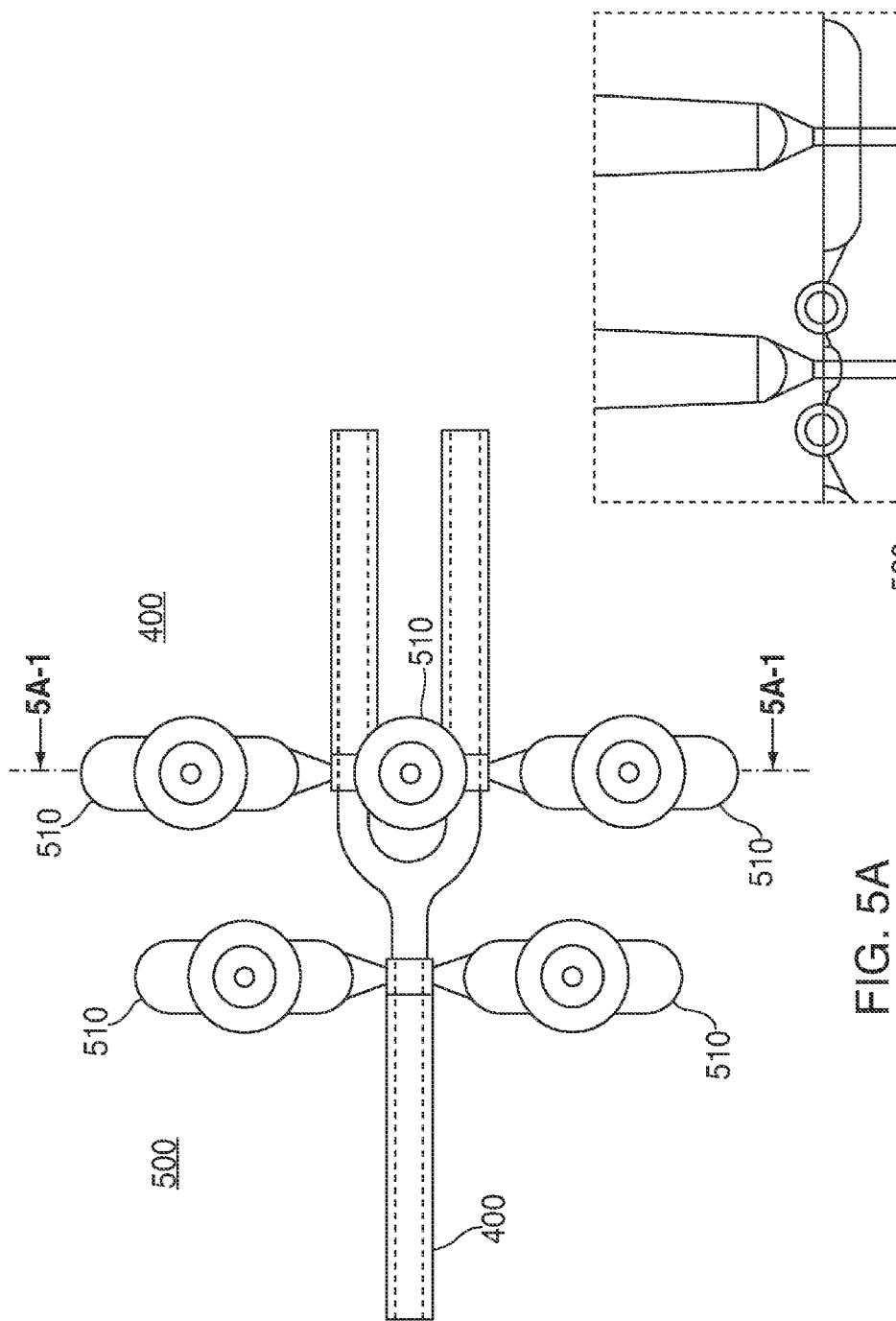

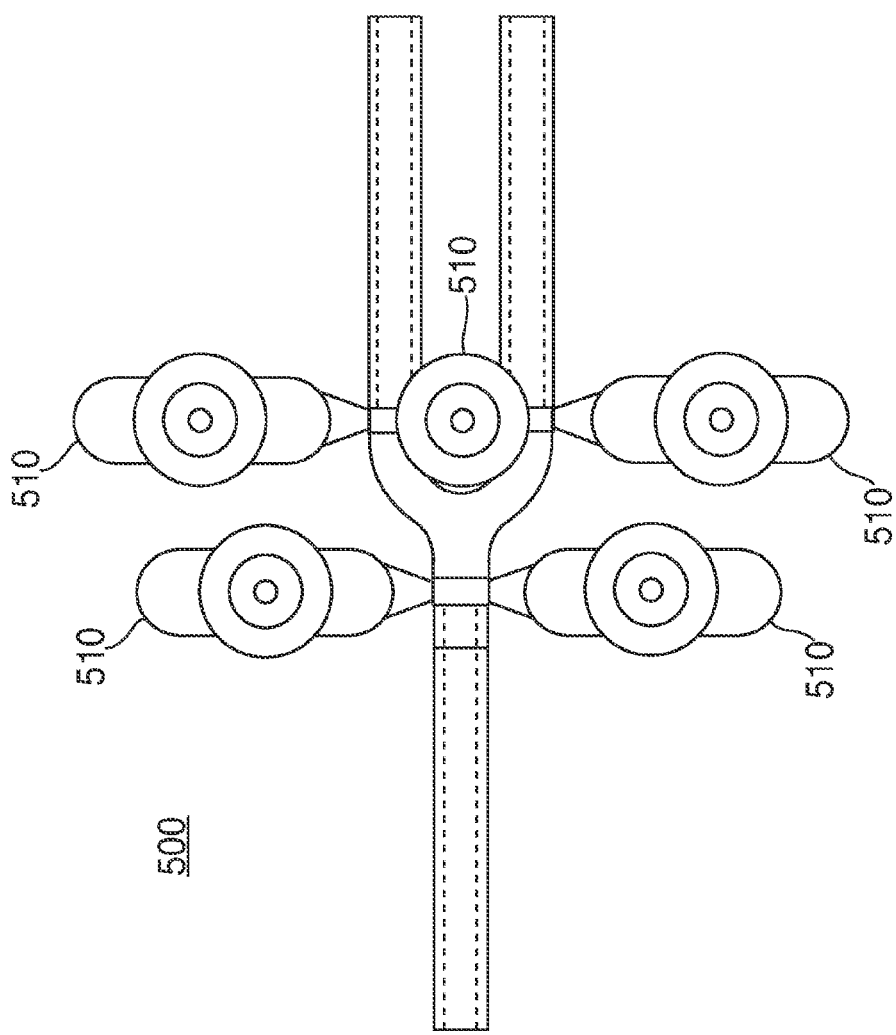

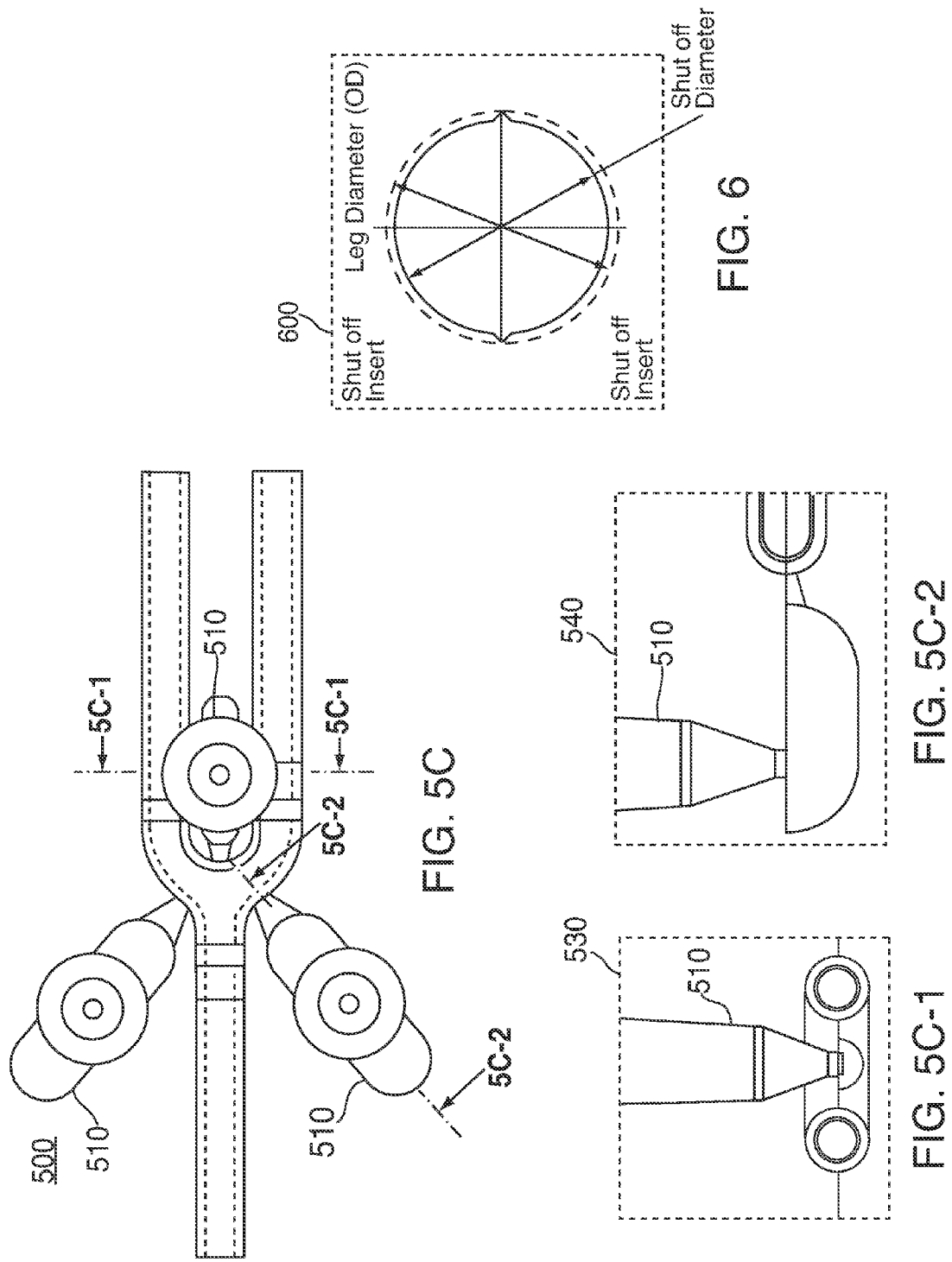

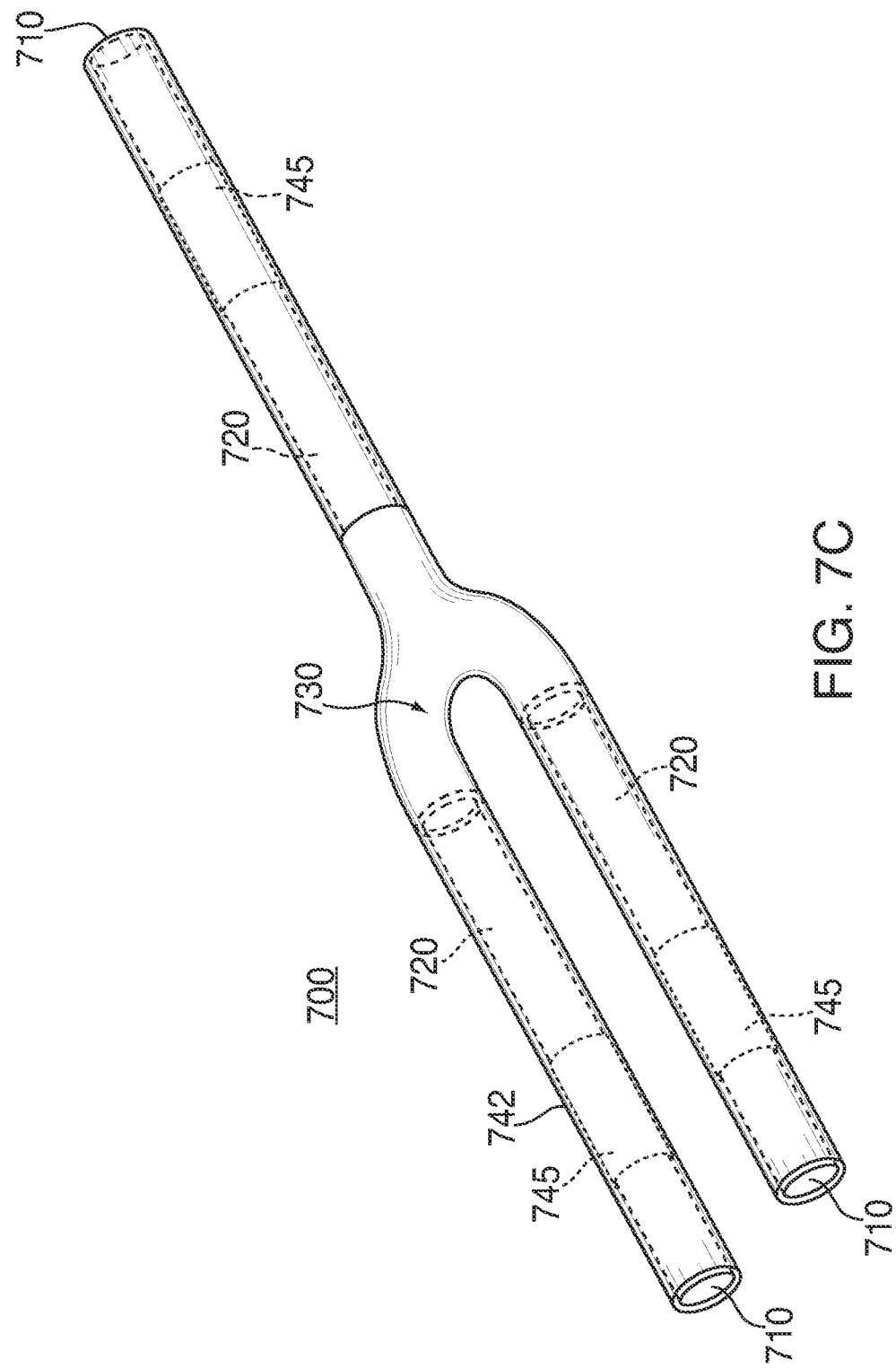

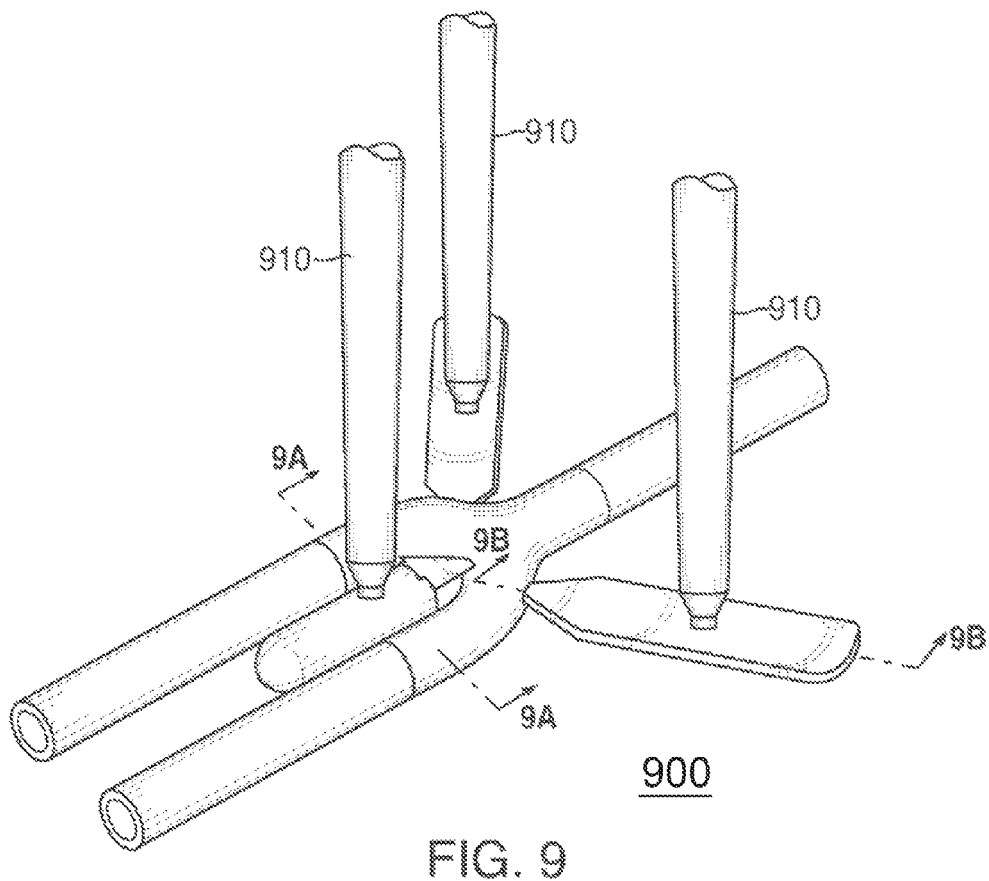
FIG. 9
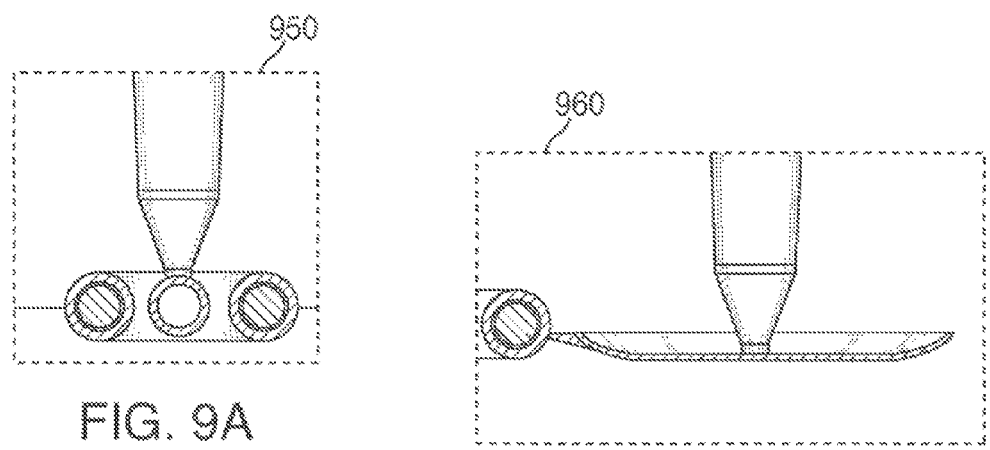
FIG. 9A
FIG. 9B

MOLDED SPLITTER STRUCTURES AND METHODS FOR MAKING THE SAME

CROSS-REFERENCE TO RELATED APPLICATIONS

This application claims the benefit of previously filed U.S. Provisional Patent Application No. 61/298,087, filed Jan. 25, 2010, entitled "Small Diameter Cable with Splitter Assembly," U.S. Provisional Patent Application No. 61/384,103, filed Sep. 17, 2010, entitled "Molded Splitter Structures and Systems and Methods for Making the Same," U.S. Provisional Patent Application No. 61/319,772, filed Mar. 31, 2010, entitled "Thin Audio Plug and Coaxial Routing of Wires," U.S. Provisional Patent Application No. 61/384,097, filed Sep. 17, 2010, entitled "Cable Structures and Systems Including Super-Elastic Rods and Methods for Making the Same," U.S. Provisional Patent Application No. 61/326,102, filed Apr. 20, 2010, entitled "Audio Plug with Core Structural Member and Conductive Rings," U.S. Provisional Patent Application No. 61/349,768, filed May 28, 2010, entitled "Molding an Electrical Cable Having Centered Electrical Wires," U.S. Provisional Patent Application No. 61/378,311, filed Aug. 30, 2010, entitled "Molded Cable Structures and Systems and Methods for Making the Same," and U.S. Provisional Application No. 61/378,314, filed Aug. 30, 2010, entitled "Extruded Cable Structures and Systems and Methods for Making the Same." Each of these provisional applications is incorporated by reference herein in their entireties.

BACKGROUND

Wired headsets are commonly used with many portable electronic devices such as portable music players and mobile phones. Headsets can include non-cable components such as a jack, headphones, and/or a microphone and one or more cables that interconnect the non-cable components. The cables can be joined together at a bifurcation region—that is a region where three cable legs join together. Because cables can be manufactured using different approaches, different splitter structures may be required to join the cable legs together.

SUMMARY

Splitter structures and systems and methods for manufacturing splitter structures of a cable structure are disclosed.

A cable structure can interconnect various non-cable components of a headset such as, for example, a plug, headphones, and/or a communications box to provide a headset. The cable structure can include several legs (e.g., a main leg, a left leg, and a right leg) that each connect to a non-cable component, and each leg may be connected to one another at a bifurcation region (e.g., a region where the main leg appears to split into the left and right legs). Cable structures according to embodiments of this invention provide aesthetically pleasing interface connections between the non-cable components and legs of the cable structure, for example such that the interface connections appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another can exhibit a substantially smooth variation in diameter along the length of the legs of the cable structure.

The interconnection of the three legs at the bifurcation region can vary depending on how the cable structure is manufactured. In one approach, the cable structure can be a single-segment unibody cable structure. In this approach, all three legs are jointly formed, for example using an extrusion process, and no additional processing is required to electrically couple the conductors contained therein. In another approach, the cable structure can be a multi-segment unibody cable structure. In this approach, the legs may be manufactured as discrete segments, but require additional processing to electrically couple conductors contained therein. In some embodiments, the segments can be joined together using a splitter.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 3B shows an illustrative schematic view of successive steps for connecting legs with an overmold splitter in accordance with an embodiment of the invention.

FIGS. 4A-G show illustrative views of a cable structure having a tube-shape splitter in accordance with an embodiment of the invention;

FIGS. 5A-C-2 show illustrative systems for producing a tube-shaped splitter in accordance with an embodiment of the invention;

FIG. 6 shows an illustrative view of a shut off insert that may used to produce a tube-shaped splitter in accordance with an embodiment of the invention;

FIGS. 7A-E show illustrative views of a cable structure having another tube-shaped splitter in accordance with an embodiment of the invention.

FIGS. 9-9B show an illustrative system for producing a portion of a tube-shaped splitter in accordance with an embodiment of the invention;

DETAILED DESCRIPTION OF THE DISCLOSURE

Figure 1A:
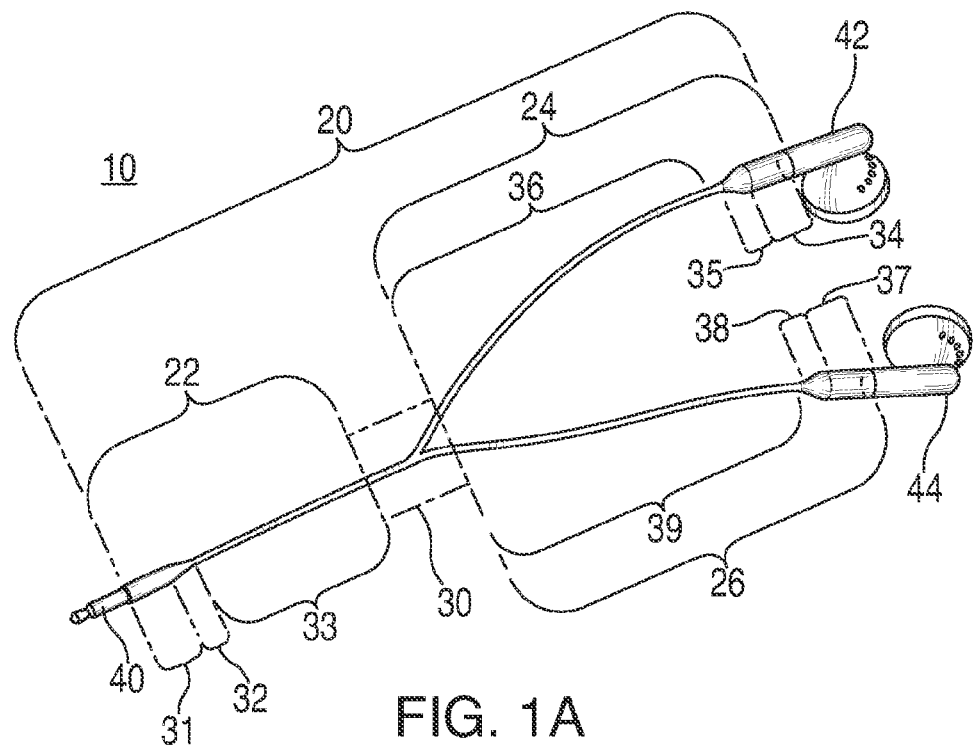
FIGS. 1A and 1B illustrate different headsets having a cable structure that seamlessly integrates with non-cable components in accordance with some embodiments of the invention.

Cable structures for use in headsets are disclosed. The cable structure interconnects various non-cable components of a headset such as, for example, a plug, headphones, and/or a communications box to provide a headset. The cable structure can include multiple legs (e.g., a main leg, a left leg, and a right leg) that each connect to a non-cable structure, and each leg may be connected to each other at a bifurcation region (e.g., a region where the main leg appears to split into the left and right legs). Cable structures according to embodiments of this invention provide aesthetically pleasing interface connections between the non-cable components and legs of the cable structure. The interface connections between a leg and a non-cable component are such that they appear to have been constructed jointly as a single piece, thereby providing a seamless interface.

In addition, because the dimensions of the non-cable components typically have a dimension that is different than the dimensions of a conductor bundle being routed through the legs of the cable structure, one or more legs of the cable structure can have a variable diameter. The change from one dimension to another is accomplished in a manner that maintains the spirit of the seamless interface connection between a leg and the non-cable component throughout the length of the leg. That is, each leg of the cable structure exhibits a substantially smooth surface, including the portion of the leg having a varying diameter. In some embodiments, the portion of the leg varying in diameter may be represented mathematically by a bump function, which requires all aspects of the variable diameter transition to be smooth. In other words, a cross-section of the variable diameter portion can show a curve or a curve profile.

The interconnection of the three legs at the bifurcation region can vary depending on how the cable structure is manufactured. In one approach, the cable structure can be a single-segment unibody cable structure. In this approach, all three legs are jointly formed and no additional processing is required to electrically couple the conductors contained therein. Construction of the single-segment cable may be such that the bifurcation region does not require any additional support. If additional support is required, an over-mold can be used to add strain relief to the bifurcation region.

In another approach, the cable structure can be a multi-segment unibody cable structure. In this approach, the legs may be manufactured as discrete segments, but require additional processing to electrically couple conductors contained therein. The segments can be joined together using a splitter. Many different splitter configurations can be used, and the use of some splitters may be based on the manufacturing process used to create the segment.

The cable structure can include a conductor bundle that extends through some or all of the legs. The conductor bundle can include conductors that interconnect various non-cable components. The conductor bundle can also include one or more rods constructed from a superelastic material. The superelastic rods can resist deformation to reduce or prevent tangling of the legs.

The cable structure can be constructed using many different manufacturing processes. The processes include injection molding, compression molding, and extrusion. In injection and compression molding processes, a mold is formed around a conductor bundle or a removable rod. The rod is removed after the mold is formed and a conductor bundle is threaded through the cavity. In extrusion processes, an outer shell is formed around a conductor bundle.

FIG. 1A shows an illustrative headset 10 having cable structure 20 that seamlessly integrates with non-cable components 40, 42, 44. For example, non-cable components 40, 42, and 44 can be a male plug, left headphones, and right headphones, respectively. Cable structure 20 has three legs 22, 24, and 26 joined together at bifurcation region 30. Leg 22 may be referred to herein as main leg 22, and includes the portion of cable structure 20 existing between non-cable component 40 and bifurcation region 30. In particular, main leg 22 includes interface region 31, bump region 32, and non-interface region 33. Leg 24 may be referred to herein as left leg 24, and includes the portion of cable structure 20 existing between non-cable component 42 and bifurcation region 30. Leg 26 may be referred to herein as right leg 26, and includes the portion of cable structure 20 existing between non-cable component 44 and bifurcation region 30. Both left and right legs 24 and 26 include respective interface regions 34 and 37, bump regions 35 and 38, and non-interface regions 36 and 39.

Legs 22, 24, and 26 generally exhibit a smooth surface throughout the entirety of their respective lengths. Each of legs 22, 24, and 26 can vary in diameter, yet still retain the smooth surface.

Non-interface regions 33, 36, and 39 can each have a predetermined diameter and length. The diameter of non-interface region 33 (of main leg 22) may be larger than or the same as the diameters of non-interface regions 36 and 39 (of left leg 24 and right leg 26, respectively). For example, leg 22 may contain a conductor bundle for both left and right legs 24 and 26 and may therefore require a greater diameter to accommodate all conductors. In some embodiments, it is desirable to manufacture non-interface regions 33, 36, and 39 to have the smallest diameter possible, for aesthetic reasons. As a result, the diameter of non-interface regions 33, 36, and 39 can be smaller than the diameter of any non-cable component (e.g., non-cable components 40, 42, and 44) physically connected to the interfacing region. Since it is desirable for cable structure 20 to seamlessly integrate with the non-cable components, the legs may vary in diameter from the non-interfacing region to the interfacing region.

Bump regions 32, 35, and 38 provide a diameter changing transition between interfacing regions 31, 34, and 37 and respective non-interfacing regions 33, 36, and 39. The diameter changing transition can take any suitable shape that exhibits a fluid or smooth transition from any interface region to its respective non-interface region. For example, the shape of the bump region can be similar to that of a cone or a neck of a wine bottle. As another example, the shape of the taper region can be stepless (i.e., there is no abrupt or dramatic step change in diameter, or no sharp angle at an end of the bump region). Bump regions 32, 35, and 38 may be mathematically represented by a bump function, which requires the entire diameter changing transition to be stepless and smooth (e.g., the bump function is continuously differentiable).

Figure 1B:
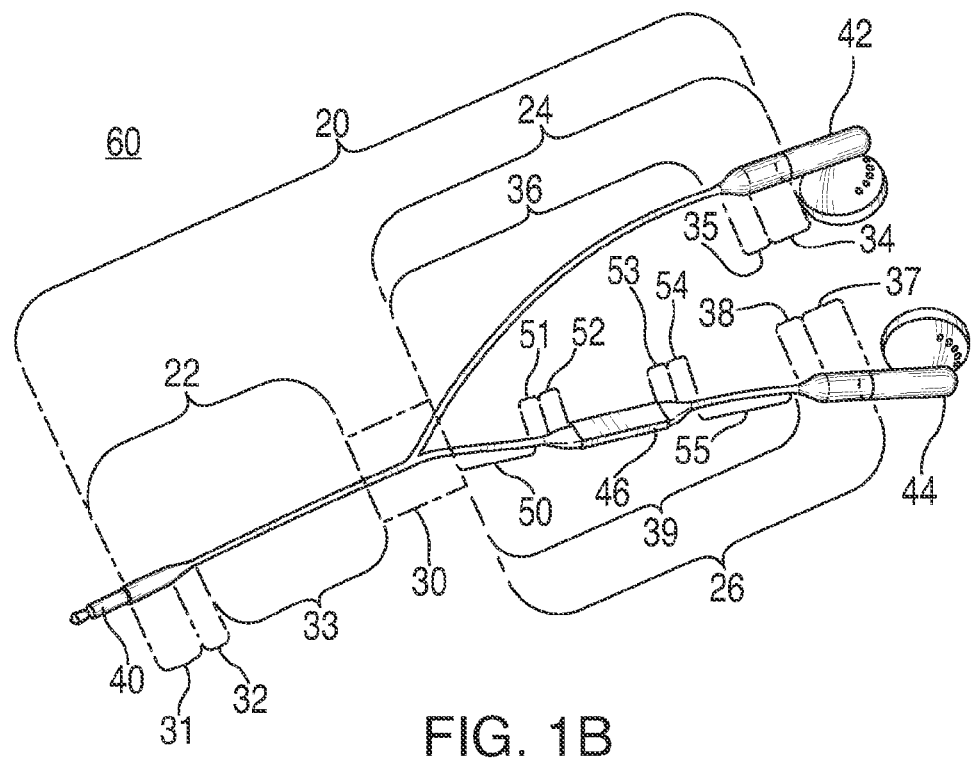
Figure 1C:
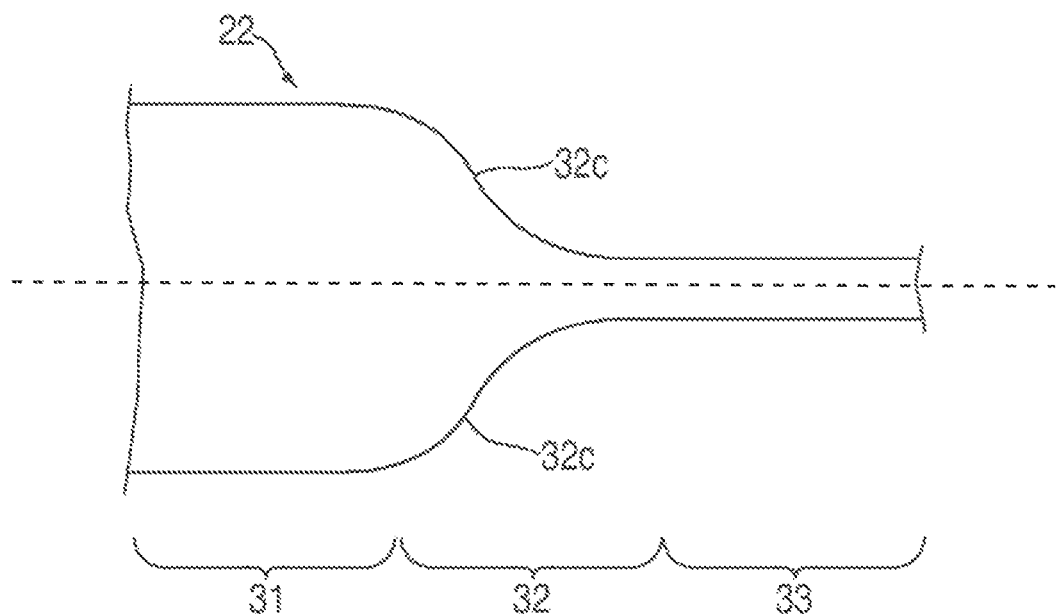
FIGS. 1C and 1D show illustrative cross-sectional views of a portion of a leg in accordance with some embodiments of the invention.
Figure 1D:
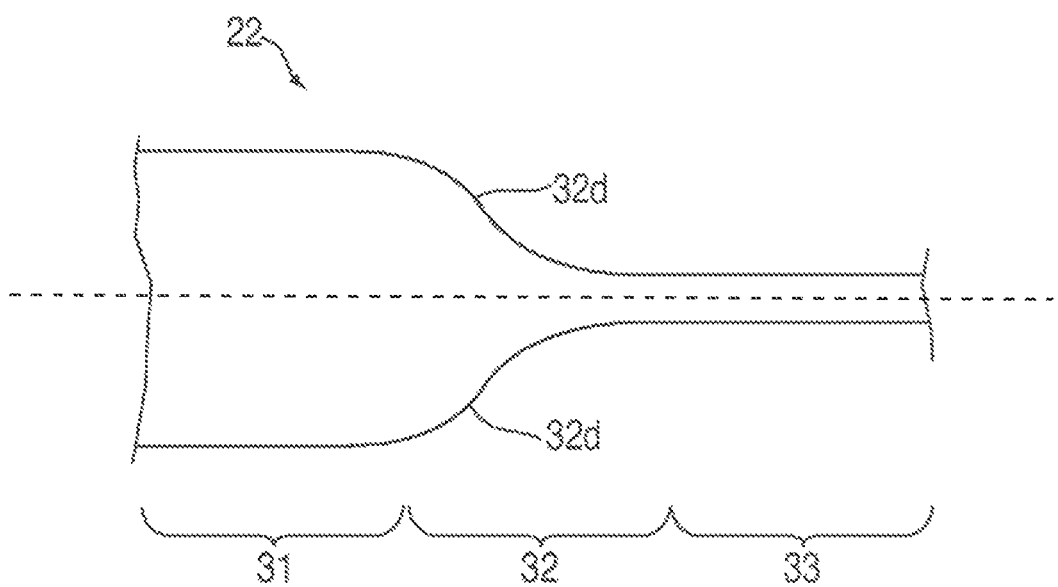

FIGS. 1C and 1D show illustrative cross-sectional views of a portion of main leg 22 in accordance with embodiments of the invention. Both FIGS. 1C and 1D show main leg 22 with a center axis (as indicated by the dashed line) and symmetric curves 32c and 32d. Curves 32c and 32d illustrate that any suitable curve profile may be used in bump region 32. Thus the outer surface of bump region 32 can be any surface that deviates from planarity in a smooth, continuous fashion.

Interface regions 31, 34, and 37 can each have a predetermined diameter and length. The diameter of any interface region can be substantially the same as the diameter of the non-cable component it is physically connected to, to provide an aesthetically pleasing seamless integration. For example, the diameter of interface region 31 can be substantially the same as the diameter of non-cable component 40. In some embodiments, the diameter of a non-cable component (e.g., component 40) and its associated interfacing region (e.g., region 31) are greater than the diameter of the non-interface region (e.g., region 33) they are connected to via the bump region (e.g., region 32). Consequently, in this embodiment, the bump region decreases in diameter from the interface region to the non-interface region.

In another embodiment, the diameter of a non-cable component (e.g., component 40) and its associated interfacing region (e.g., region 31) are less than the diameter of the non-interface region (e.g., region 33) they are connected to via the bump region (e.g., region 32). Consequently, in this embodiment, the bump region increases in diameter from the interface region to the non-interface region.

The combination of the interface and bump regions can provide strain relief for those regions of headset 10. In one embodiment, strain relief may be realized because the interface and bump regions have larger dimensions than the non-interface region and thus are more robust. These larger dimensions may also ensure that non-cable portions are securely connected to cable structure 20. Moreover, the extra girth better enables the interface and bump regions to withstand bend stresses.

The interconnection of legs 22, 24, and 26 at bifurcation region 30 can vary depending on how cable structure 20 is manufactured. In one approach, cable structure 20 can be a single-segment unibody cable structure. In this approach all three legs are manufactured jointly as one continuous structure and no additional processing is required to electrically couple the conductors contained therein. That is, none of the legs are spliced to interconnect conductors at bifurcation region 30, nor are the legs manufactured separately and then later joined together. Some single-segment unibody cable structures may have a top half and a bottom half, which are molded together and extend throughout the entire unibody cable structure. For example, such single-segment unibody cable structures can be manufactured using injection molding and compression molding manufacturing processes (discussed below in more detail). Thus, although a mold-derived single-segment unibody cable structure has two components (i.e., the top and bottom halves), it is considered a single-segment unibody cable structure for the purposes of this disclosure. Other single-segment unibody cable structures may exhibit a contiguous ring of material that extends throughout the entire unibody cable structure. For example, such a single-segment cable structure can be manufactured using an extrusion process.

In another approach, cable structure 20 can be a multi-segment unibody cable structure. A multi-segment unibody cable structure may have the same appearance of the single-segment unibody cable structure, but the legs are manufactured as discrete components. The legs and any conductors contained therein are interconnected at bifurcation region 30. The legs can be manufactured, for example, using any of the processes used to manufacture the single-segment unibody cable structure.

The cosmetics of bifurcation region 30 can be any suitable shape. In one embodiment, bifurcation region 30 can be an overmold structure that encapsulates a portion of each leg 22, 24, and 26. The overmold structure can be visually and tactically distinct from legs 22, 24, and 26. The overmold structure can be applied to the single or multi-segment unibody cable structure. In another embodiment, bifurcation region 30 can be a two-shot injection molded splitter having the same dimensions as the portion of the legs being joined together. Thus, when the legs are joined together with the splitter mold, cable structure 20 maintains its unibody aesthetics. That is, a multi-segment cable structure has the look and feel of single-segment cable structure even though it has three discretely manufactured legs joined together at bifurcation region 30. Many different splitter configurations can be used, and the use of some splitters may be based on the manufacturing process used to create the segment.

Cable structure 20 can include a conductor bundle that extends through some or all of legs 22, 24, and 26. Cable structure 20 can include conductors for carrying signals from non-cable component 40 to non-cable components 42 and 44. Cable structure 20 can include one or more rods constructed from a superelastic material. The rods can resist deformation to reduce or prevent tangling of the legs. The rods are different than the conductors used to convey signals from non-cable component 40 to non-cable components 42 and 44, but share the same space within cable structure 20. Several different rod arrangements may be included in cable structure 20.

In yet another embodiment, one or more of legs 22, 24, and 26 can vary in diameter in two or more bump regions. For example, the leg 22 can include bump region 32 and another bump region (not shown) that exists at leg/bifurcation region 30. This other bump region may vary the diameter of leg 22 so that it changes in size to match the diameter of cable structure at bifurcation region 30. This other bump region can provide additional strain relief.

In some embodiments, another non-cable component can be incorporated into either left leg 24 or right leg 26. As shown in FIG. 1B, headset 60 shows that non-cable component 46 is integrated within leg 26, and not at an end of a leg like non-cable components 40, 42 and 44. For example, non-cable component 46 can be a communications box that includes a microphone and a user interface (e.g., one or more mechanical or capacitive buttons). Non-cable component 46 can be electrically coupled to non-cable component 40, for example, to transfer signals between communications box 46 and one or more of non-cable components 40, 42 and 44.

Non-cable component 46 can be incorporated in non-interface region 39 of leg 26. In some cases, non-cable component 46 can have a larger size or girth than the non-interface regions of leg 26, which can cause a discontinuity at an interface between non-interface region 39 and communications box 46. To ensure that the cable maintains a seamless unibody appearance, non-interface region 39 can be replaced by first non-interface region 50, first bump region 51, first interface region 52, communications box 46, second interface region 53, second bump region 54, and second non-interface region 55.

Similar to the bump regions described above in connection with the cable structure of FIG. 1A, bump regions 51 and 54 can handle the transition from non-cable component 46 to non-interface regions 50 and 55. The transition in the bump region can take any suitable shape that exhibits a fluid or smooth transition from the interface region to the non-interface regions. For example, the shape of the taper region can be similar to that of a cone or a neck of a wine bottle.

Similar to the interface regions described above in connection with the cable structure of FIG. 1A, interface regions 52 and 53 can have a predetermined diameter and length. The diameter of the interface region is substantially the same as the diameter of non-cable component 46 to provide an aesthetically pleasing seamless integration. In addition, and as described above, the combination of the interface and bump regions can provide strain relief for those regions of headset 10.

In some embodiments, non-cable component 46 may be incorporated into a leg such as leg 26 without having bump regions 51 and 54 or interface regions 52 and 53. Thus, in this embodiment, non-interfacing regions 50 and 55 may be directly connected to non-cable component 46.

Cable structures 20 can be constructed using many different manufacturing processes. The processes discussed herein include those that can be used to manufacture the single-segment unibody cable structure or legs for the multi-segment unibody cable structure. In particular, these processes include injection molding, compression molding, and extrusion.

A more detailed explanation of compression molded cable structures can be found, for example, in commonly assigned U.S. patent application Ser. No. 13/013,540 (now U.S. Patent Application Publication No. 2011/0180302) and Ser. No. 13/013,542 (now U.S. Patent Application Publication No. 2011/0180303), both filed concurrently herewith, the disclosures of which are incorporated by reference herein in their entireties. In one embodiment, a cable structure can be manufactured by compression molding two urethane sheets together to form the sheath of the cable structure. In another embodiment, a cable structure can be manufactured by compression molding at least one silicon sheet to form the sheath of the cable structure. Both sheaths may be constructed to have a hollow cavity extending throughout so that a conductor bundle can be routed through the cavity.

A more detailed explanation of extruded cable structures can be found, for example, in commonly assigned U.S. patent application Ser. No. 13/013,553 (now U.S. Patent Application Publication No. 2011/0180321) and Ser. No. 13/013,556 (now U.S. Patent Application Publication No. 2011/0182460), both filed concurrently herewith, the disclosures of which are incorporated by reference herein in their entireties.

A more detailed explanation of injection molded cable structures can be found in commonly assigned U.S. patent application Ser. No. 13/013,557 (now U.S. Patent Application Publication No. 2011/0180962) filed concurrently herewith, the disclosure of which is incorporated by reference herein in its entirety.

Regardless of how cable structure 20 is constructed, the outer portion is referred to herein as the sheath or cable sheath. The sheath can be stripped away to expose conductors and anti-tangle rods. Stripping the sheath off of a portion of one or more cable legs may be required to electrically couple conductors of one leg to a non-cable component and/or to conductors in a different leg of cable structure 20.

Figure 2A:
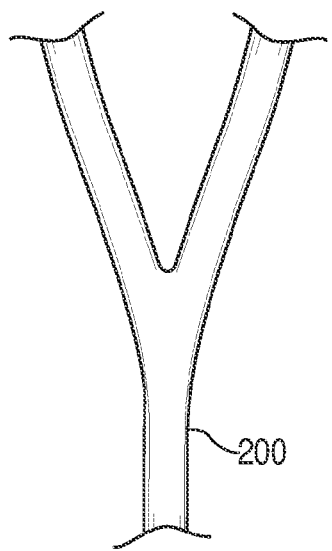
FIGS. 2A-C show illustrative progressive stages of how an overmold splitter can be applied to a single-segment cable structure in accordance with an embodiment of the invention.
Figure 2B:
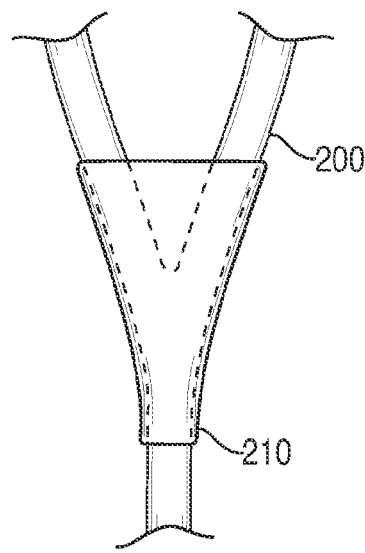
Figure 2C:
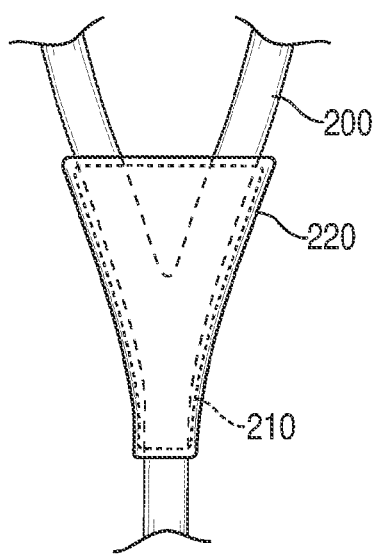

FIGS. 2A-C show illustrative progressive stages of how an overmold splitter can be applied to a jointly formed multi-leg cable structure in accordance with an embodiment of the invention. Starting with FIG. 2A, the bifurcation region of jointly formed multi-leg cable structure 200 is shown. FIG. 2B shows inner mold 210 disposed around the sheath of cable structure 200. Inner mold 210 can be applied using an injection mold process. The manner in which inner mold 210 is disposed around cable structure 200 can vary. In one embodiment, inner mold 210 can have any suitable thickness and can vary in cable structure coverage. In another embodiment, inner mold 210 can vary in shape. For example, inner mold 210 can conform to the shape of the sheath at the bifurcation region, in which case inner mold 210 may resemble the tube shape of structure 200. As another example, the inner mold 210 can resemble a wedge shape, as shown.

FIG. 2C shows outer mold 220 disposed around inner mold 210 and cable structure 200. Outer mold 220 can be applied using an injection mold process. Outer mold 220 can have any suitable thickness and shape. For example, outer mold 220 may be thicker than inner mold 210. The shape of outer mold may mimic the shape of inner mold 210.

The material used for inner mold 210 and outer mold 220 may be different. Inner mold 210 may be constructed from a material that is harder than the sheath of cable structure. In addition, inner mold 210 may have a higher melting temperature than the sheath to ensure the sheath bonds to inner mold 210. Outer mold 220 may be constructed from a material having a higher melting temperature than inner mold 210 to ensure that inner mold 210 bonds to outer mold.

Figure 3A:
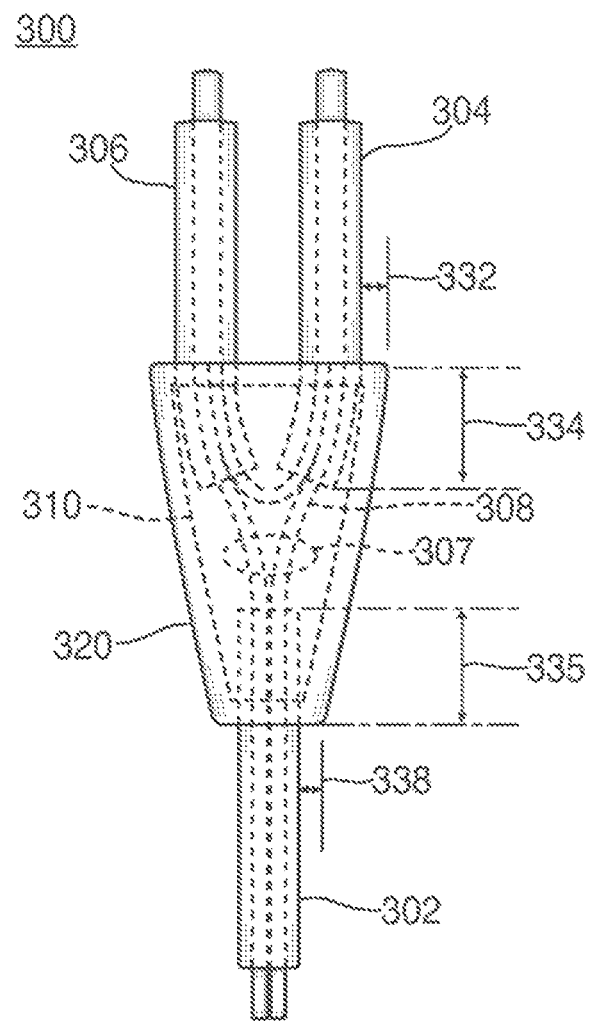
FIG. 3A shows a multi-segment cable structure with an overmold splitter in accordance with an embodiment of the invention.

Although, FIGS. 2A-C show that an overmold splitter may be applied to a jointly formed multi-leg cable structure, an overmold splitter may also be used to interconnect two or more independently formed legs, as illustrated in FIGS. 3A and 3B. FIG. 3A shows multi-segment cable structure 300 having legs 302, 304, and 306 joined together at a bifurcation region. The bifurcation region shows how legs 302, 304, and 306 have been spliced to electrically connect conductors 307. Anti-tangle rods 308 (sometimes referred to herein as super-elastic rods) can also be seen in the bifurcation region.

Inner mold 310 and outer mold 320 may exhibit many of the same properties of inner and outer molds 210 and 220 discussed above in connection with FIG. 2. That is, inner and outer molds 310 and 320 may have any suitable thickness and shape, and can be constructed from different materials. In addition, both molds 310 and 320 can be applied using an injection molding process. Dimensions 332, 334, 335, and 338 may be selected to define the shape of outer mold 320. In one embodiment, dimensions 332, 334, 335, and 338 may be selected to minimize the size of outer mold 320—to promote the seamless appearance of the cable structure—and to provide sufficient structural integrity to hold legs 302, 304, and 306 together.

Minimal sizing of the overmold splitter (as shown in FIGS. 2 and 3A) may be achieved because no insert or "chicken foot" is used to provide structural stability. The inner mold/outer mold combination provides sufficient structural stability in lieu of any insert.

FIG. 3B shows an illustrative schematic view of successive steps for connecting legs 340, 350, and 360 with an overmold splitter in accordance with an embodiment of the invention. Each leg can have any suitable number of wires. For example, leg 340 can include six wires, leg 350 can include four wires, and leg 360 can include two wires. The wires can be connected using any suitable approach. In one embodiment, the wires can be connected to printed circuit board 370, which has traces coupling wires in leg 340 to wires in either leg 350 or leg 360.

The wires of the cables can be coupled to circuit board 370 using any suitable approach. For example, the wires can be coupled to the board using soldering or surface mount technology, tape, or combinations of these. In FIG. 3B, each wire can be coupled to circuit board 370 via solder joints 372. In some embodiments, an additional fastening mechanism (e.g., Kevlar ties) can be used to further secure the wires to the circuit board.

After the wires have been connected, first injection mold material 380 can be overmolded to cover circuit board 370 and the soldered wires. Any suitable material can be molded over the circuit board, including for example a plastic (e.g., polypropylene, polyethylene, or a polymer). In some embodiments, first material 380 can be selected specifically based on structural or stress and strain resistant characteristics. First material 380 can extend over any suitable portion of board 370 and legs 340, 350, and 360.

After first material 380 has been applied, any excess portion of circuit board 370 extending beyond material 380 can be removed. A cosmetic material 390 can be placed over first material 380 and circuit board 370 to provide an aesthetically pleasing interface. Any suitable material may be selected for cosmetic material 390, and it may applied with any suitable thickness or shape.

The construction nature of the overmold splitter will cause a user to notice a tactile difference between a leg and the bifurcation region where the overmold splitter resides. This tactile difference is eliminated in the splitter embodiments discussed in connection with FIGS. 4-11.

FIGS. 4-11 use variations of a two-shot injection molding process to produce a tube-shaped splitter that has the same dimensions as the legs being joined together at the bifurcation region. This results in a multi-segment cable structure having a unibody look and feel even though it is constructed with several discrete parts. Referring now to FIGS. 4-6, a splitter structure for connecting several discrete legs produced from an extrusion process is discussed.

FIG. 4A shows a bifurcation region of cable structure 400 having stripped legs 401, 402, and 403 in accordance with an embodiment of the invention. Legs 401-403 may have been formed from an extrusion process. Conductors 405 and anti-tangle rods 406 are secured and ready to receive the first shot of a tube-shaped splitter.

FIG. 4B shows a bifurcation region of cable structure 400 having first shot 410 of a tube-shaped splitter applied thereto in accordance with an embodiment of the invention. First shot 410 includes ring regions 411-413 and non-ring region 414, both of which encapsulate conductors 405 and anti-tangle rods 406. Ring regions 411-413 can have the same diameter as legs 401-403, respectively. Ring regions 411-413 can have a width, W, as shown. Ring regions 411-413 may provide structural integrity needed for use of a shut-off plate (not shown) during formation of the second shot. Non-ring region 414 can have a diameter smaller than ring regions 411-413. The material of non-ring region 414 can be uniformly distributed around conductors 405 and anti-tangle rods 406. In addition, non-ring region 414 is sufficiently thick to prevent conductor or rod pinching during application of the second shot.

FIG. 4C shows a bifurcation region of cable structure 400 having second shot 420 of a tube-shaped splitter applied thereto in accordance with an embodiment of the invention. Second shot 420 encapsulates non-ring region 414 of first shot 410 and abuts ring regions 411-413. Second shot 420 is dimensioned so that legs 401-403, ring regions 411-413, second shot 420 have a seamless unibody look and feel. For example, second shot 420 can have a diameter that is substantially the same as the diameter of ring regions 411-413 and legs 401-403.

Figure 4D:
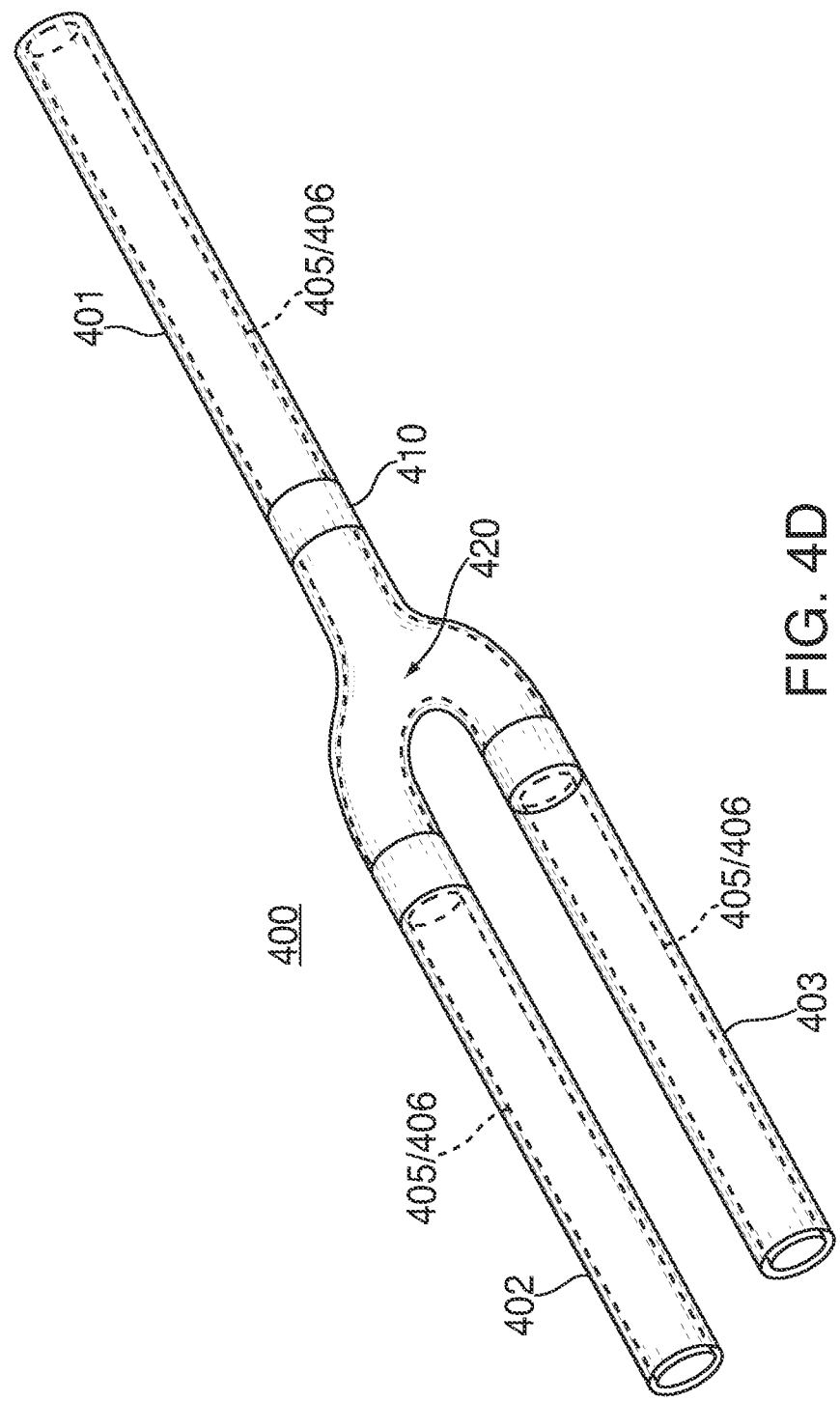

FIG. 4D shows an alternative view of a bifurcation region of cable structure 400 having second shot 420 applied thereto in accordance with an embodiment of the invention. In contrast to FIG. 4C, first shot 410, conductors 405, and anti-tangle rods 406 are shown as opaque structures, whereas the sheath of legs 401-403 and second shot 420 are shown as transparent structures.

Figure 4G:
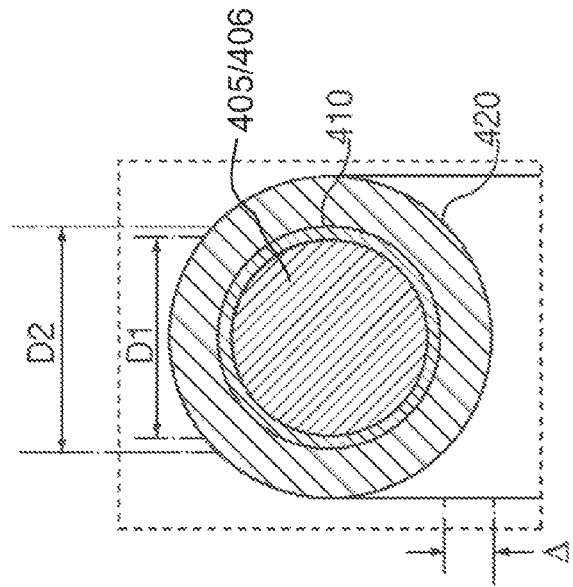
Figure 4E:
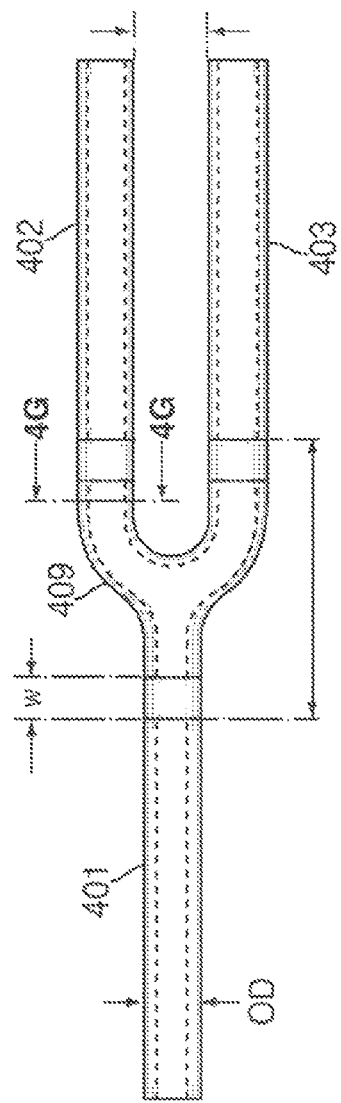
Figure 4F:
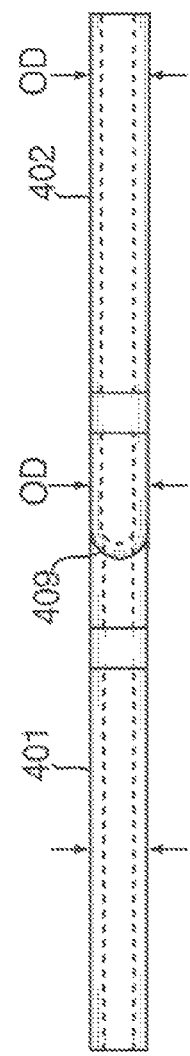

FIG. 4E shows an illustrative top view of cable structure 400 having second shot 420 applied thereto and FIG. 4F shows an illustrative side view of structure 400 in accordance with embodiments of the invention. The outer diameter, OD, of cable structure 400 is substantially constant throughout, including legs 401-403 and tube-shaped splitter 409.

FIG. 4G shows an illustrative cross-sectional view of cable structure 400 taken along lines 4G-4G of FIG. 4E. FIG. 4G shows conductors 405 and anti-tangle rods 405 surrounded by first shot 410, which is surrounded by second shot 420. The combination of conductors 405 and anti-tangle rods 406 has a diameter, D1. The portion of first shot 410 shown has a diameter, D2. The thickness of second shot 420 (shown as a delta) is one-half the difference of OD and D2.

FIGS. 5A and 5B show an illustrative system 500 for applying the first or second shots of a tube-shaped splitter to a cable structure in accordance with an embodiment of the invention. System 500 can include injectors 510, which can be positioned in different locations depending on whether the first or second shot is being formed. In particular, FIG. 5A shows the position of injectors for forming the first shot. A clamping tool (not shown) may enclose a portion of cable structure 400 to provide the pressure needed for thermoplastic or other material to form the first shot. In addition, a shut off insert (shown in FIG. 6) may be used as part of the clamping tool.

Referring to FIG. 6, shut off insert 600 may prevent thermoplastic bleed off from causing the first shot (i.e., the ring regions) to have a diameter that exceeds the diameter of the legs. This may be accomplished by having the diameter of shut off insert 600 be less than the desired diameter of the leg. Three copies of shut off insert 600 may be used in system 500, with each insert 600 clamped down on a portion of a leg adjacent to where the ring regions will be molded.

Referring back to FIG. 5A, a cross-sectional view of system 500 taken along lines 5A-1-5A-1 is shown in dashed box 520 of FIG. 5A-1. FIG. 5B shows the position of injectors 510 for molding the second shot of a tube shaped splitter. Similar to FIG. 5A, a clamping tool and a shut off insert (e.g., shut off insert 600) are used in the formation of the second shot. The shut off inserts may be positioned on the ring regions of the first shot.

FIG. 5C shows an alternative injector arrangement to that shown in FIG. 5B for forming the second shot in accordance with an embodiment of the invention. As shown, injectors 510 are positioned to provide equal distribution of pressure to mitigate any movement of the first shot during formation of the second shot. Again, as discussed above in connection with FIG. 5B, a clamping tool and shut off inserts are used in the formation of the second shot. FIGS. 5C-1 and 5C-2 also show cross-sectional views of system 500 taken along lines 5C-1-5C-1 and 5C-2-5C-2 in dashed boxes 530 and 540, respectively.

Figure 7A:
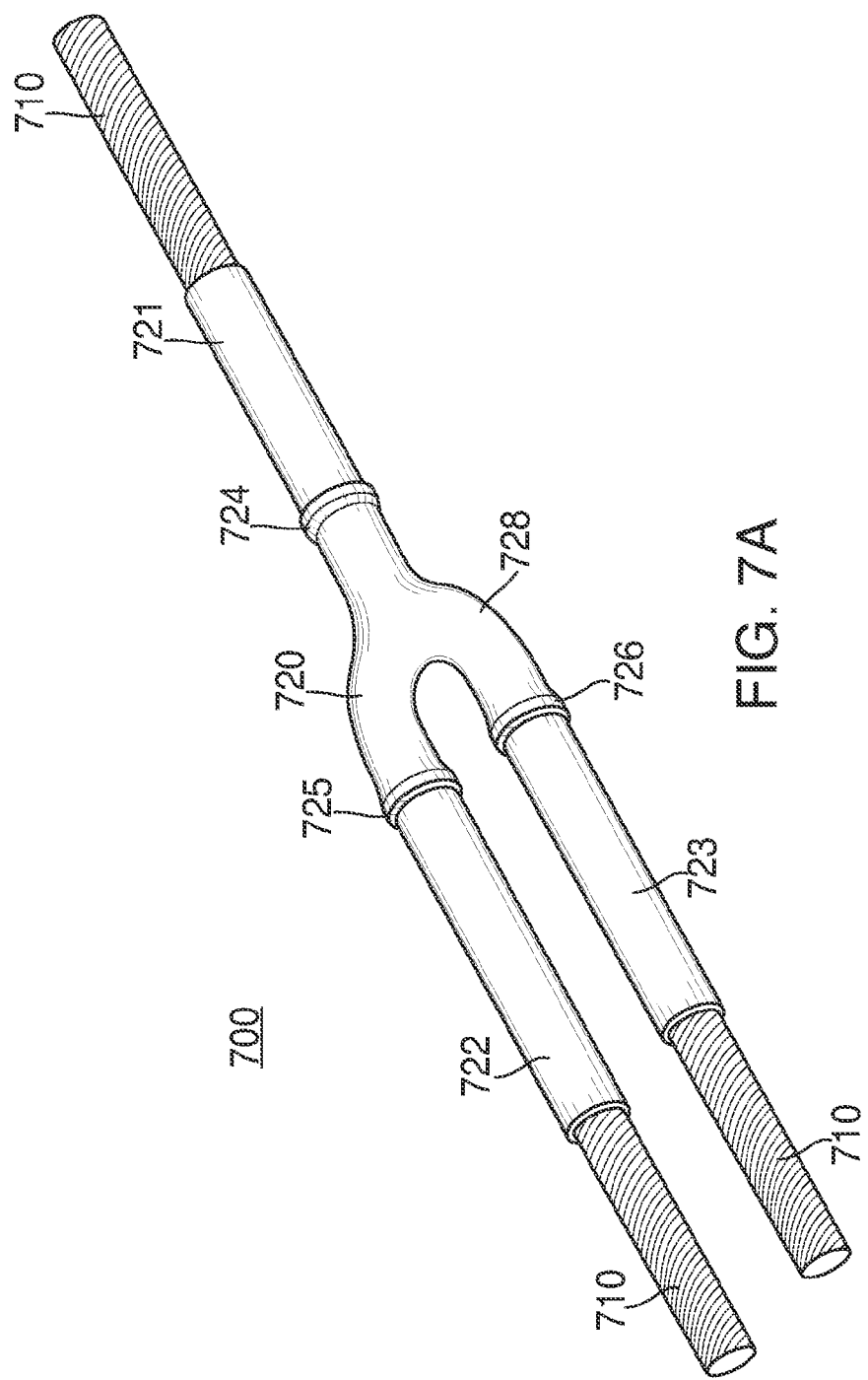
Figure 7B:
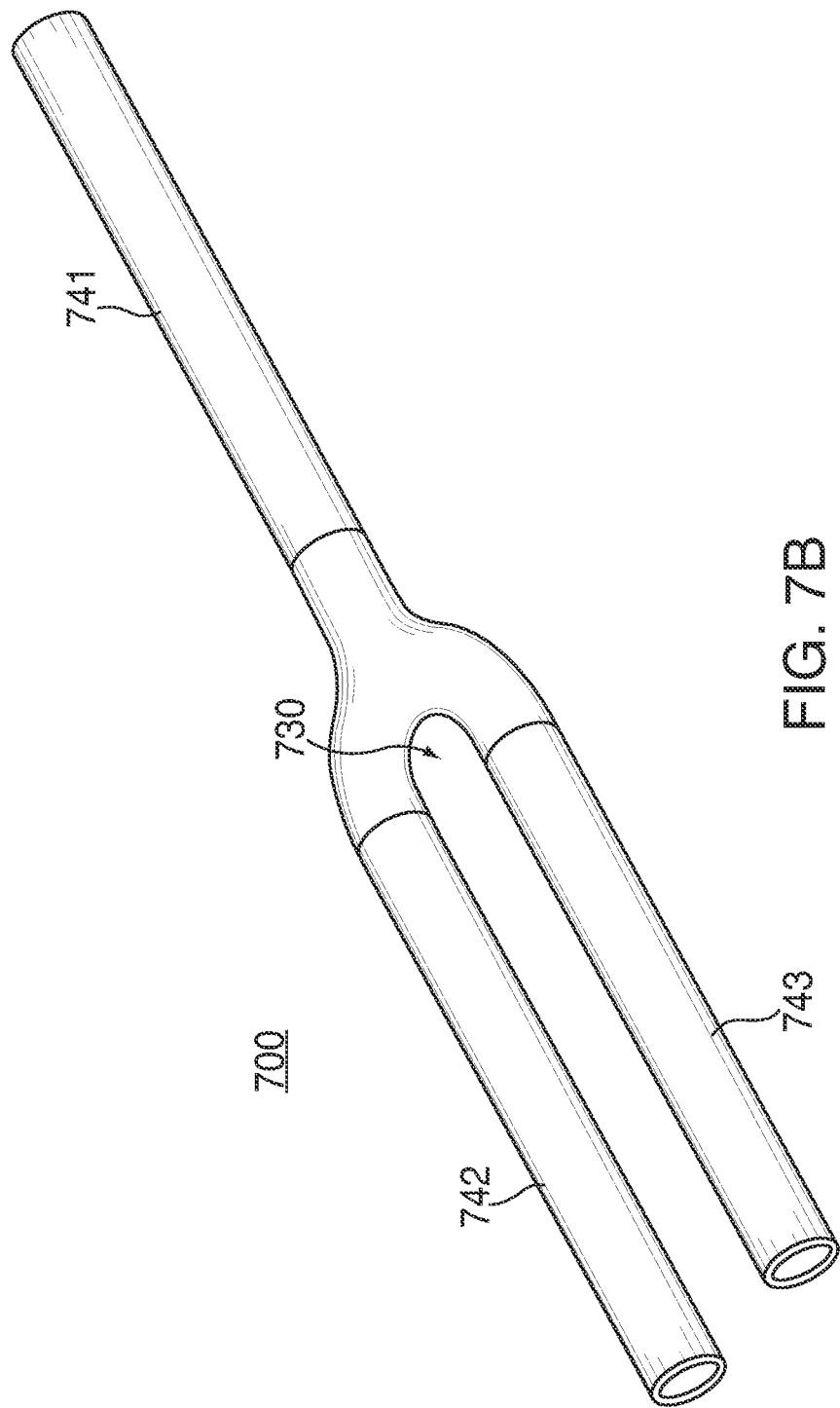
Figure 7D:
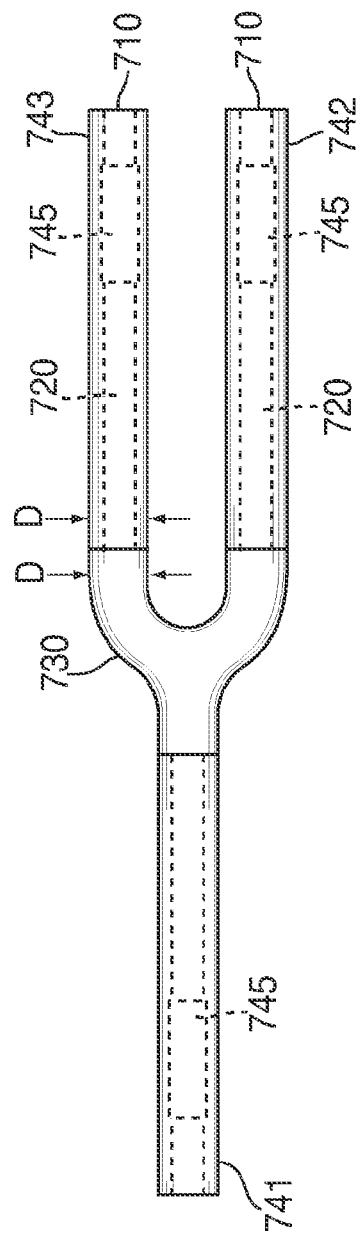
Figure 7E:
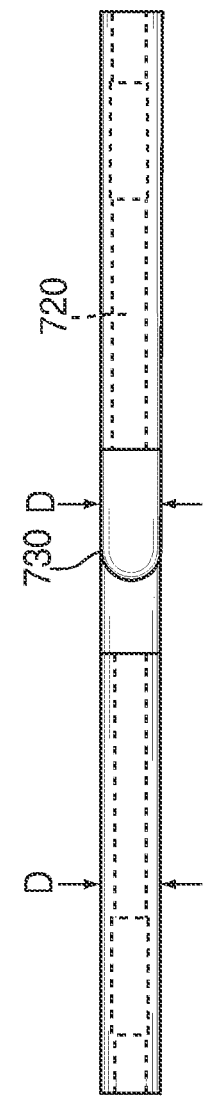
Figure 8:
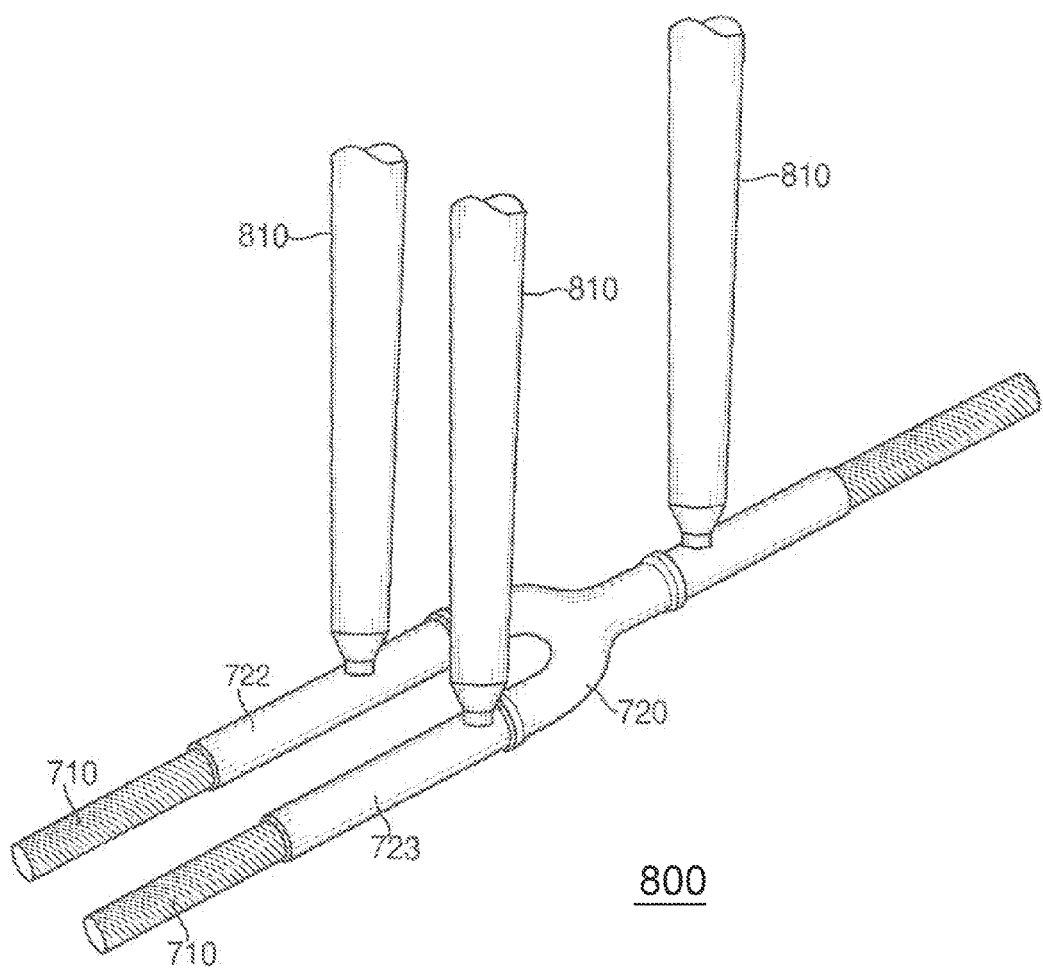
FIG. 8 shows an illustrative system for producing a portion of a tube-shaped splitter in accordance with an embodiment of the invention.

Referring now to FIGS. 7-9, a splitter structure for use with molded cable structures is discussed. The molded cable structures can be formed from a compression molding process or an injection molding process. The molded cable structures used with the splitter in FIGS. 7-9 can be hollow. That is, the molded cable structures have cavities that pass through their entire length, thereby providing a pathway for routing a conductor bundle. As will be apparent in the discussion below, three hollow legs (e.g., a main leg, a right leg, and a left leg) interface with the splitter such the legs and the splitter appear to be a one-piece construction. Thus, the visible portions of the cable leg and splitter have substantially the same dimensions.

FIG. 7A shows a bifurcation region of cable structure 700 having first shot 720 of a tube-shaped splitter applied to a bundle of conductors and/or anti-tangle rods 710 in accordance with an embodiment of the invention. Bundle 710 can be any suitable arrangement of conductors and/or anti-tangle rods. A more detail discussion of bundles can be found in U.S. Provisional Patent Application No. 61/384,097, filed Sep. 17, 2010, entitled "Cable Structures and Systems Including Super-Elastic Rods and Methods for Making the Same."

First shot 720 is applied to bundle 710, and in particular to the bifurcation region of bundle 710. First shot 720 can be applied using a high pressure injection mold or a lower pressure compression mold. First shot 720 can include extension regions 721-723, lip regions 724-726 (i.e., lip 726 is shown in more detail in detail view 950), and u-shaped region 728. The dimensions of first shot 720 are smaller than the outer dimension of the finished cable structure. In particular, the dimensions of extension regions 721-723 are sized to permit hollow cable structures to be slid over the bundle and extension region. The lip regions 724-726 serve as a stop for hollow cable structure insertion. U-shaped region 728 may be dimensioned larger than extension regions to provide added rigidity to the cable structure so that it will not be moved during application of the second shot.

FIG. 7B shows a bifurcation region of cable structure 700 of second shot 730 of a tube-shaped splitter applied to first shot 720 in accordance with an embodiment of the invention. FIG. 7B also shows hollow cable structures 741-743, which abut second shot 730 at lip regions 724-726. Second shot 730 has the same diameter as cable structures 741-743 and can be applied using a high pressure injection mold. After second shot 730 is applied, the cable structure has a unibody look and feel because the tube-shaped splitter seamlessly blends with the hollow cable structures.

FIG. 7C shows an alternative view of a bifurcation region of cable structure 700 having second shot 730 applied thereto in accordance with an embodiment of the invention. In particular cable structures 741-743 are shown as wire frames whereas the other components are shown as opaque. Glue 745 may be applied to a portion of first shot 720 to secure cable structures 741-743 in place.

FIG. 7D shows an illustrative top view of cable structure 700 and FIG. 7E shows an illustrative side view of cable structure 700. FIGS. 7D and 7E show that the diameters of hollow cable structure 741-743 are the same as the outer diameter D of the tube-shaped splitter.

FIG. 8 shows an illustrative system 800 for applying the first shot of a tube-shaped splitter to a cable structure in accordance with an embodiment of the invention. System 800 can include injectors 810 that can inject a thermoplastic material onto bundle 710 to form first shot 720. A clamping tool (not shown) may be used to apply the pressure needed to form the mold for first shot 720.

FIG. 9 shows an illustrative system 900 for applying the second shot of a tube-shaped splitter to a cable structure in accordance with an embodiment of the invention. System 900 includes injectors 910 that are positioned to prevent movement of the first shot when the thermoplastic material is injected. A clamping tool and a shut off insert may be used in the formation of second shot 730. The shut off insert may be dimensioned to prevent bleed off from affecting the outer diameter sizing of the cable structure. Cross-sectional views taken along lines 9A-9A and 9B-9B are shown in dashed-line boxes 950 and 960 of FIGS. 9A and 9B, respectively.

Figure 10:
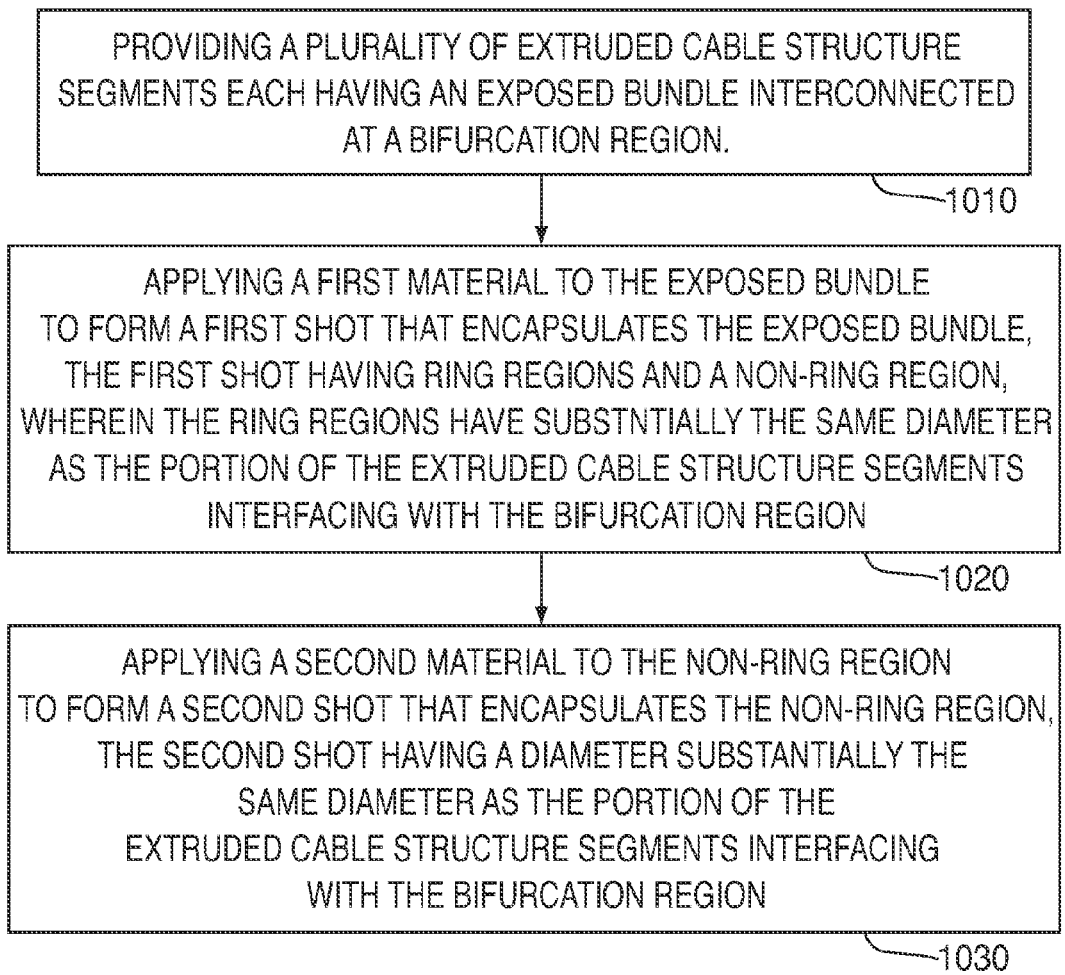
FIGS. 10-11 show flowcharts of illustrative steps that may be performed to manufacture tube-shaped splitters in accordance with embodiments of the invention.

FIG. 10 illustrates steps that may be performed to mold a splitter onto a cable structure in accordance with an embodiment of the invention. These steps may be performed to produce cable structure 400 of FIGS. 4A-4G. Starting at step 1010, a plurality of extruded cable structure segments are provided. Each cable structure segment has an exposed bundle interconnected at a bifurcation region. At step 1020, a first material is applied to the exposed bundle to form a first shot that encapsulates the exposed bundle. The first shot having ring regions and a non-ring region, wherein the ring regions have substantially the same diameter as the portion of the extruded cable structure segments interfacing with the bifurcation region. An example of a first shot is shown in FIG. 45. At step 1030, a second material is applied to the non-ring region to form a second shot that encapsulates the non-ring region. The second shot has a diameter substantially the same diameter as the portion of the extruded cable structure segments interfacing with the bifurcation region.

Figure 11:
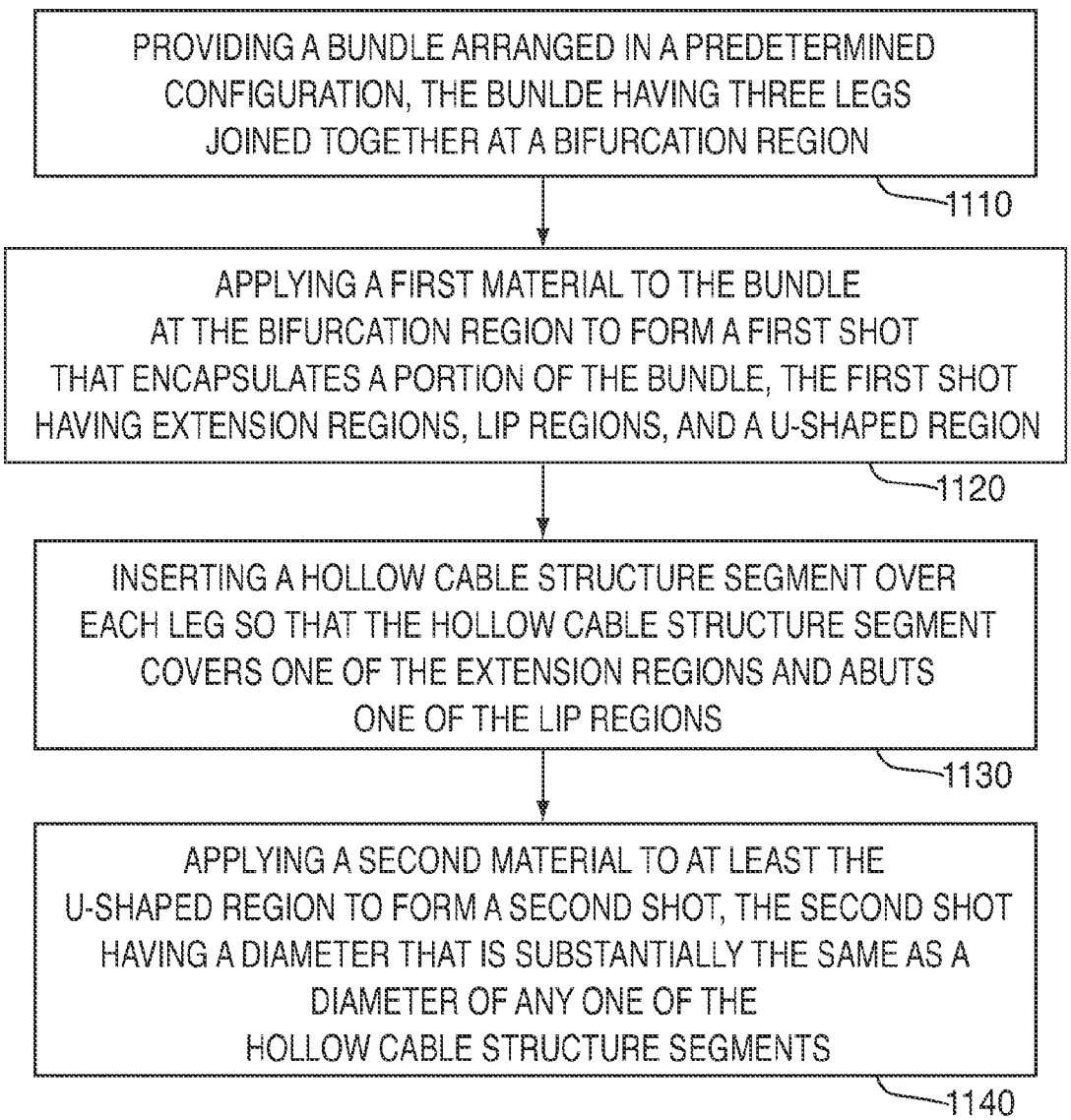

FIG. 11 illustrates steps that may be performed to mold a splitter onto a cable structure in accordance with an embodiment of the invention. These steps may be performed to produce cable structure 700 of FIGS. 7A-C. Starting at step 1110, a bundle arranged in a predetermined configuration is provided. The bundle can have three legs joined together at a bifurcation region. At step 1120, a first material is applied to the bundle at the bifurcation region to form a first shot that encapsulates a portion of the bundle. The first shot can have extension regions, lip regions, and a u-shaped region. At step 1130, a hollow cable structure segment is inserted over each leg so that the hollow cable structure segment covers one of the extension regions and abuts one of the lip regions. At step 1140, a second material is applied to at least the u-shaped region to form a second shot. The second shot having a diameter that is substantially the same as a diameter of any one of the hollow cable structure segments.

It should be understood that processes of FIGS. 10-11 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A cable structure, comprising:
a plurality of cable structure legs, each leg having a splitter interface region that has a predetermined diameter; and
a tube-shaped splitter comprising:
a plurality of leg interface regions, wherein each leg interface region is coupled to one of the splitter interface regions, wherein each leg interface region has a diameter that is substantially the same as the predetermined diameter of the splitter interface region to which it is coupled, and wherein the plurality of leg interface regions is a single molded shot of material that encapsulates the entire portion of a conductor bundle extending between two cable structure legs of the plurality of cable structure legs; and
another shot of material that encapsulates a first portion of the single molded shot and that abuts at least a first leg interface region of the plurality of leg interface regions.

2. The cable structure of claim 1, wherein the other shot has a maximum thickness that is substantially the same or less than the predetermined diameter of the splitter interface region of any leg.

3. The cable structure of claim 1, wherein the predetermined diameter of each splitter interface region is substantially the same, and wherein the other shot has a thickness that is substantially the same as the predetermined diameter.

4. The cable structure of claim 1, wherein the cable structure legs are extruded cable structure legs.

5. The cable structure of claim 1, wherein the diameter of at least one leg interface region provides a portion of an outer diameter of the cable structure.

6. The cable structure of claim 1, wherein the predetermined diameter of the splitter interface region of a first cable structure leg of the plurality of cable structure legs is different than the predetermined diameter of the splitter interface region of a second cable structure leg of the plurality of cable structure legs.

7. The cable structure of claim 1, wherein:
the splitter provides a portion of an outer surface of the cable structure; and
the splitter does not overlap any portion of any cable structure leg of the plurality of cable structure legs.

8. A cable structure comprising:
a first cable structure leg;
a second cable structure leg;
a singular molded splitter component comprising:
- a first ring region that abuts an end of the first cable structure leg;
- a second ring region that abuts an end of the second cable structure leg; and
- a non-ring region that extends between the first ring region and the second ring region, wherein an outer diameter of the non-ring region is smaller than an outer diameter of the first ring region; and another molded splitter component that encapsulates the non-ring region.

9. The cable structure of claim 8, wherein an outer diameter of the other molded splitter component is the same as at least one of:
the outer diameter of the first ring region; and
an outer diameter of the end of the first cable structure leg.

10. The cable structure of claim 8, wherein the singular molded splitter component encapsulates a conductor bundle that extends between the first cable structure leg and the second cable structure leg.

11. A cable structure comprising:
a first cable sheath comprising a first cable sheath cavity that extends within the first cable sheath between a first end of the first cable sheath and a second end of the first cable sheath;
a second cable sheath comprising a second cable sheath cavity that extends within the second cable sheath between a first end of the second cable sheath and a second end of the second cable sheath;
a conductor bundle that extends out from the first cable sheath cavity through the first end of the first cable sheath and into the second cable sheath cavity through the second end of the second cable sheath; and
a splitter comprising:
  a first splitter component comprising:
    a first ring region that abuts the first end of the first cable sheath;
    a second ring region that abuts the second end of the second cable sheath; and
    a non-ring region that extends between the first ring region and the second ring region, wherein the first splitter component encapsulates the portion of the conductor bundle that extends between the first end of the first cable sheath and the second end of the second cable sheath; and
  a second splitter component that encapsulates the non-ring region and that abuts each one of the first ring region and the second ring region.

12. The cable structure of claim 11, wherein the first splitter component is a single shot of molded material.

13. The cable structure of claim 11, wherein:
the first splitter component is a single shot of a first molded material; and
the second splitter component is a single shot of a second molded material.

14. The cable structure of claim 11, wherein the splitter comprises a molded thermoplastic.

15. The cable structure of claim 11, wherein an outer diameter of the first ring region provides a first outer diameter of a first portion of the cable structure.

16. The cable structure of claim 15, wherein:
an outer diameter of the first end of the first cable sheath provides a second outer diameter of a second portion of the cable structure; and
the first outer diameter is the same dimension as the second outer diameter.

17. The cable structure of claim 11, wherein an outer diameter of the non-ring region is less than an outer diameter of the first ring region.

18. The cable structure of claim 11, wherein:
an outer diameter of the first ring region provides a first outer diameter of a first portion of the cable structure; and
an outer diameter of the second splitter component provides a second outer diameter of a second portion of the cable structure.

19. The cable structure of claim 18, wherein the first outer diameter is the same dimension as the second outer diameter.

20. The cable structure of claim 11, wherein:
an outer diameter of the first end of the first cable sheath seamlessly blends with an outer diameter of the first ring region; and
an outer diameter of the first ring region seamlessly blends with an outer diameter of the second splitter component.

21. The cable structure of claim 11, wherein the conductor bundle comprises:
a first conductor; and
a second conductor that is electrically connected to the first conductor within the splitter.

* * * * *

UNITED STATES PATENT AND TRADEMARK OFFICE
CERTIFICATE OF CORRECTION

PATENT NO. : 8,796,555 B2  
APPLICATION NO. : 13/013537  
DATED : August 5, 2014  
INVENTOR(S) : Jonathan Aase et al.

Page 1 of 1

It is certified that error appears in the above-identified patent and that said Letters Patent is hereby corrected as shown below:

On the Title Page, Column 2, under "Assistant Examiner", delete "Chrisopher L Augustin" and insert -- Christopher L Augustin --, therefor.

Signed and Sealed this  
Fourteenth Day of July, 2015

Michelle K. Lee  
*Director of the United States Patent and Trademark Office*